(12) United States Patent
Todoriki et al.

(10) Patent No.: US 9,293,770 B2
(45) Date of Patent: Mar. 22, 2016

(54) GRAPHENE OXIDE, POSITIVE ELECTRODE FOR NONAQUEOUS SECONDARY BATTERY USING GRAPHENE OXIDE, METHOD OF MANUFACTURING POSITIVE ELECTRODE FOR NONAQUEOUS SECONDARY BATTERY, NONAQUEOUS SECONDARY BATTERY, AND ELECTRONIC DEVICE

(71) Applicant: SEMICONDUCTOR ENERGY LABORATORY CO., LTD., Atsugi-shi, Kanagawa-ken (JP)

(72) Inventors: Hiroatsu Todoriki, Nagano (JP); Mikio Yukawa, Kanagawa (JP); Yumiko Saito, Kanagawa (JP); Masaki Yamakaji, Kanagawa (JP); Rika Yatabe, Kanagawa (JP); Tatsuya Ikenuma, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 69 days.

(21) Appl. No.: 13/826,710

(22) Filed: Mar. 14, 2013

(65) Prior Publication Data
US 2013/0266859 A1 Oct. 10, 2013

(30) Foreign Application Priority Data

Apr. 10, 2012 (JP) ................... 2012-089346
May 31, 2012 (JP) ................... 2012-125138

(51) Int. Cl.
*H01M 4/62* (2006.01)
*H01M 4/133* (2010.01)
(Continued)

(52) U.S. Cl.
CPC ............. *H01M 4/625* (2013.01); *C01B 31/043* (2013.01); *H01M 4/131* (2013.01); *H01M 4/133* (2013.01);
(Continued)

(58) Field of Classification Search
CPC ....... H01M 4/625; H01M 4/64; H01M 4/133; H01M 4/131
See application file for complete search history.

(56) References Cited

U.S. PATENT DOCUMENTS

| | | |
|---|---|---|
| 7,179,561 B2 | 2/2007 | Niu et al. |
| 7,572,542 B2 | 8/2009 | Naoi |

(Continued)

FOREIGN PATENT DOCUMENTS

| | | |
|---|---|---|
| CN | 001346162 A | 4/2002 |
| CN | 1964917 | 5/2007 |

(Continued)

OTHER PUBLICATIONS

Wang.L et al., "A facile method of preparing mixed conducting LiFePO4/graphene composites for lithium-ion batteries", Solid State Ionics, 2010, vol. 181, pp. 1685-1689.

(Continued)

*Primary Examiner* — Stewart Fraser
(74) *Attorney, Agent, or Firm* — Nixon Peabody LLP; Jeffrey L. Costellia

(57) ABSTRACT

A graphene oxide used as a raw material of a conductive additive for forming an active material layer with high electron conductivity with a small amount of a conductive additive is provided. A positive electrode for a nonaqueous secondary battery using the graphene oxide as a conductive additive is provided. The graphene oxide is used as a raw material of a conductive additive in a positive electrode for a nonaqueous secondary battery and, in the graphene oxide, the atomic ratio of oxygen to carbon is greater than or equal to 0.405.

14 Claims, 22 Drawing Sheets

(51) Int. Cl.
  *H01M 4/64* (2006.01)
  *H01M 4/131* (2010.01)
  *H01M 4/136* (2010.01)
  *H01M 4/58* (2010.01)
  *C01B 31/04* (2006.01)
  *H01M 4/36* (2006.01)

(52) U.S. Cl.
  CPC ............ *H01M 4/136* (2013.01); *H01M 4/5825* (2013.01); *H01M 4/624* (2013.01); *H01M 4/64* (2013.01); *H01M 4/366* (2013.01); *Y02E 60/122* (2013.01)

(56) References Cited

U.S. PATENT DOCUMENTS

| Patent/Publication | Date | Inventor |
|---|---|---|
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,883,351 B2 * | 11/2014 | Todoriki et al. ............ 429/231.8 |
| 2002/0102459 A1 | 8/2002 | Hosoya et al. |
| 2007/0009799 A1 | 1/2007 | Zheng |
| 2007/0117013 A1 | 5/2007 | Hosoya et al. |
| 2007/0131915 A1 | 6/2007 | Stankovich et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2009/0253045 A1 | 10/2009 | Kotato et al. |
| 2009/0305135 A1 | 12/2009 | Shi et al. |
| 2010/0055025 A1 | 3/2010 | Jang et al. |
| 2010/0081057 A1 | 4/2010 | Liu et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0301279 A1 | 12/2010 | Nesper et al. |
| 2010/0308277 A1 | 12/2010 | Grupp et al. |
| 2010/0330421 A1 | 12/2010 | Cui et al. |
| 2011/0012067 A1 | 1/2011 | Kay |
| 2011/0111303 A1 * | 5/2011 | Kung et al. ................. 429/231.8 |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2012/0045692 A1 | 2/2012 | Takemura et al. |
| 2012/0058397 A1 | 3/2012 | Zhamu et al. |
| 2012/0063988 A1 | 3/2012 | Tour et al. |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0129736 A1 | 5/2012 | Tour et al. |
| 2012/0142111 A1 | 6/2012 | Tour et al. |
| 2012/0197051 A1 | 8/2012 | Tour et al. |
| 2012/0308891 A1 | 12/2012 | Todoriki et al. |
| 2012/0315550 A1 * | 12/2012 | Liu et al. ....................... 429/338 |
| 2012/0321953 A1 * | 12/2012 | Chen et al. .................... 429/219 |
| 2013/0156942 A1 | 6/2013 | Yamakaji et al. |
| 2013/0266869 A1 * | 10/2013 | Todoriki et al. ............ 429/231.8 |

FOREIGN PATENT DOCUMENTS

| | | |
|---|---|---|
| CN | 101094806 | 12/2007 |
| CN | 101258628 | 9/2008 |
| CN | 101849302 | 9/2010 |
| CN | 101935036 | 1/2011 |
| CN | 102456869 | 5/2012 |
| EP | 1193783 A | 4/2002 |
| EP | 1 772 428 A1 | 4/2007 |
| EP | 2 256 087 A1 | 12/2010 |
| EP | 2256845 A | 12/2010 |
| EP | 2256846 A | 12/2010 |
| EP | 2 445 049 A1 | 4/2012 |
| JP | 06-060870 | 3/1994 |
| JP | 2002-110162 | 4/2002 |
| JP | 2006-265751 | 10/2006 |
| JP | 2007-042620 | 2/2007 |
| JP | 2008-526664 | 7/2008 |
| JP | 2009-500806 | 1/2009 |
| JP | 2009-524567 | 7/2009 |
| JP | 2009-176721 | 8/2009 |
| JP | 2010-275186 | 12/2010 |
| JP | 2011-503804 | 1/2011 |
| JP | 2011-048992 | 3/2011 |
| JP | 2011-517053 | 5/2011 |
| JP | 4765077 | 9/2011 |
| JP | 2012-500179 | 1/2012 |
| JP | 2012-064571 | 3/2012 |
| JP | 2012-094516 | 5/2012 |
| JP | 2012-099467 | 5/2012 |
| JP | 2012-099468 | 5/2012 |
| JP | 2012-527396 | 11/2012 |
| JP | 2012-530044 | 11/2012 |
| KR | 2002-0025813 A | 4/2002 |
| KR | 2006-0077359 | 7/2006 |
| KR | 2007-0030274 | 3/2007 |
| KR | 2008-0091067 A | 10/2008 |
| KR | 2010-0088667 | 8/2010 |
| KR | 2010-0127729 A | 12/2010 |
| KR | 2012-0018075 A | 2/2012 |
| KR | 2012-0047782 | 5/2012 |
| TW | 540181 | 7/2003 |
| WO | WO-2005/121022 A1 | 12/2005 |
| WO | WO-2006/062947 A2 | 6/2006 |
| WO | WO-2006/071076 A1 | 7/2006 |
| WO | WO-2007/008422 A2 | 1/2007 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO 2010/022164 A1 | 2/2010 |
| WO | WO 2010/096665 A1 | 8/2010 |
| WO | WO 2010/147859 A1 | 12/2010 |
| WO | WO 2010/147860 A1 | 12/2010 |
| WO | WO 2011/016889 A2 | 2/2011 |
| WO | WO-2011/057074 A2 | 5/2011 |
| WO | WO-2011/079238 A1 | 6/2011 |
| WO | WO 2011069348 A1 * | 6/2011 |
| WO | WO-2012/023464 A1 | 2/2012 |
| WO | WO-2012/046669 A1 | 4/2012 |
| WO | WO-2012/046791 A1 | 4/2012 |

OTHER PUBLICATIONS

Padhi.A et al., "Phospho-olivines as Positive-Electrode Materials for Rechargeable Lithium Batteries,", J. Electrochem. Soc. (Journal of the Electrochemical Society), Apr. 1, 1997, vol. 144, No. 4, pp. 1188-1194.

Zhou.X et al., "Graphene modified $LiFePO_4$ cathode materials for high power lithium ion batteries ,", J. Mater. Chem. (Journal of Materials Chemistry), 2011, vol. 21, pp. 3353-3358.

Paek.S et al., "Enhanced Cyclic Performance and Lithium Storage Capacity of $SnO_2$/Graphene Nanoporous Electrodes with Three-Dimensionally Delaminated Flexible Structure,", Nano Letters, 2009, vol. 9, No. 1, pp. 72-75.

Wang.G et al., "Sn/graphene nanocomposite with 3D architecture for enhanced reversible lithium storage in lithium ion batteries,", J. Mater. Chem. (Journal of Materials Chemistry), 2009, vol. 19, No. 44, pp. 8378-8384.

Wang.D et al., "Self-Assembled $TiO_2$-Graphene Hybrid Nanostructures for Enhanced Li-Ion Insertion,", ACS Nano, 2009, vol. 3, No. 4, pp. 907-914.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/$MnO_2$ Nanostructured Textiles for High-Performance Electrochemical Capacitors,", Nano Letters, 2011, vol. 11, No. 7, pp. 2905-2911.

(56) References Cited

OTHER PUBLICATIONS

Todoriki.H et al., "High performance lithium ion battery using Graphene Net electrode,", 222nd ECS Meeting Abstract, Oct. 7, 2012, p. 1014, ECS.

Sungjin. P. et al., "Hydrazine-reduction of graphite- and graphene oxide," Carbon, Mar. 15, 2011, vol. 49, pp. 3019-3023, Elsevier.

Sungjin.P et al., "Hydrazine-reduction of graphite- and graphene oxide,", Carbon, Mar. 15, 2011, pp. 3019-3023, Elsevier.

International Search Report (Application No. JP2013/058203; PCT16793/17162) Dated Apr. 23, 2013.

Written Opinion (Application No. JP2013/058203: PCT16793/17162) Dated Apr. 23, 2013.

* cited by examiner

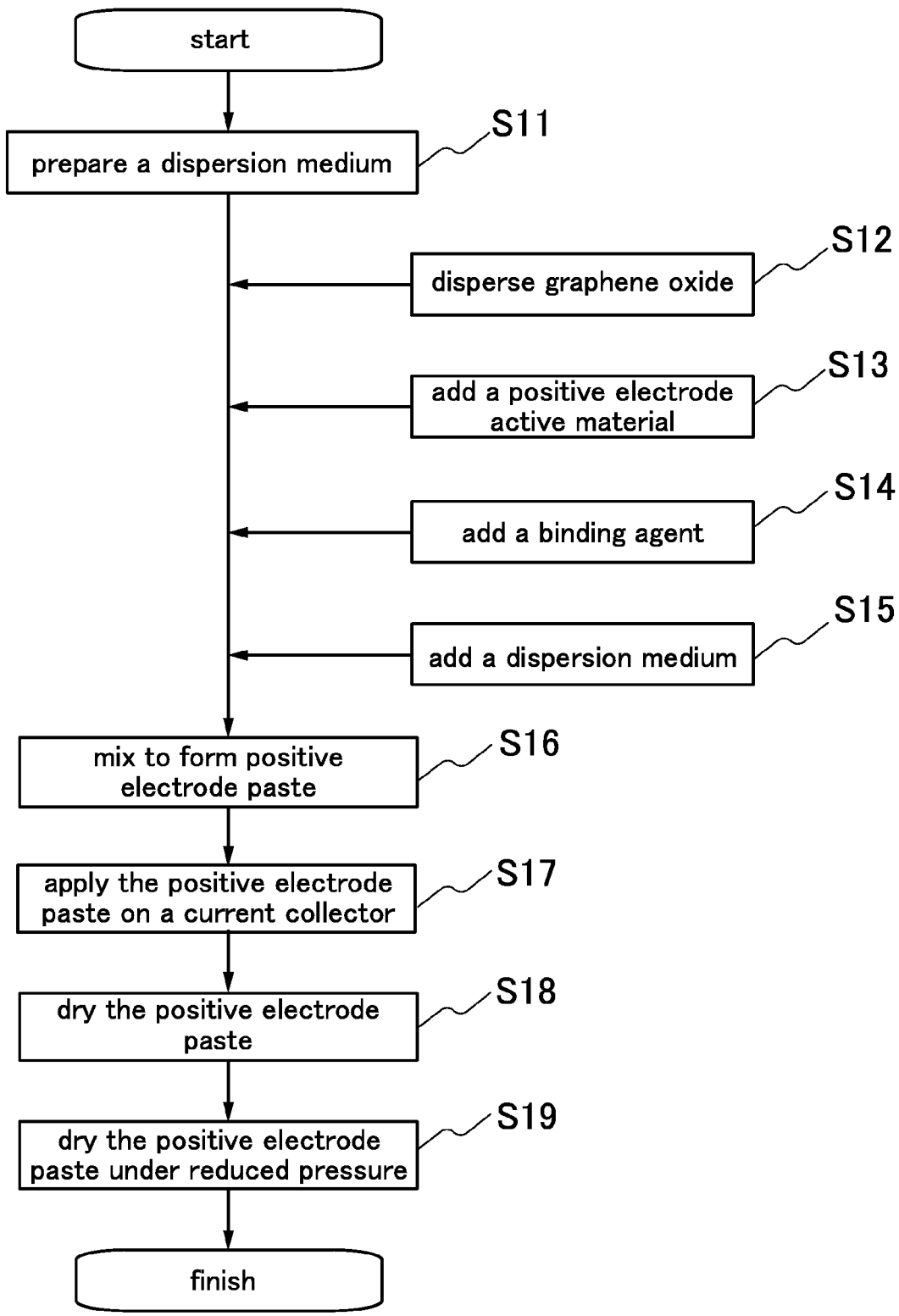

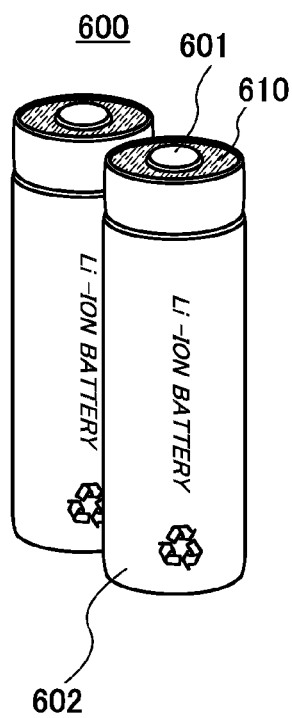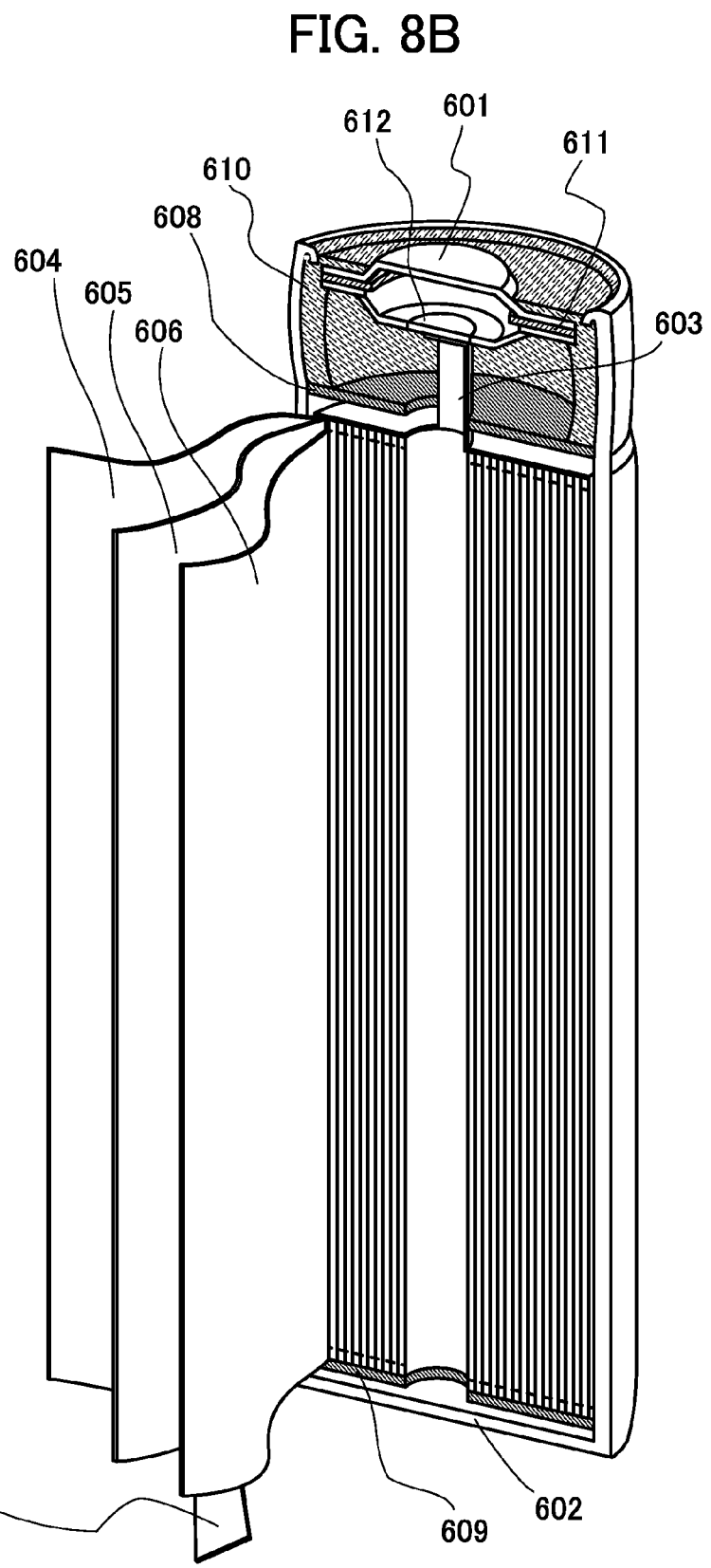
FIG. 8A
FIG. 8B

GRAPHENE OXIDE, POSITIVE ELECTRODE FOR NONAQUEOUS SECONDARY BATTERY USING GRAPHENE OXIDE, METHOD OF MANUFACTURING POSITIVE ELECTRODE FOR NONAQUEOUS SECONDARY BATTERY, NONAQUEOUS SECONDARY BATTERY, AND ELECTRONIC DEVICE

TECHNICAL FIELD

The present invention relates to a graphene oxide, a positive electrode for a nonaqueous secondary battery which uses the graphene oxide, a method of manufacturing the positive electrode for a nonaqueous secondary battery, a nonaqueous secondary battery, and electronic deices.

BACKGROUND ART

With the recent rapid spread of portable electronic devices such as cellular phones, smartphones, electronic books, and portable game machines, secondary batteries for drive power supply have been increasingly required to be smaller and to have higher capacity. Nonaqueous secondary batteries typified by lithium secondary batteries, which have advantages such as high energy density and high capacity, have been widely used as secondary batteries used for portable electronic devices.

A lithium secondary battery, which is one of nonaqueous secondary batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite which is capable of occlusion and release of lithium ions, a nonaqueous electrolyte in which an electrolyte formed of a lithium salt such as $LiBF_4$ or $LiPF_6$, and the like is dispersed in an organic solvent such as ethylene carbonate or diethyl carbonate, and the like. A lithium secondary battery are charged and discharged in such a way that lithium ions in the secondary battery are transferred between the positive electrode and the negative electrode through the nonaqueous electrolyte and intercalated into or deintercalated from the active materials of the positive electrode and the negative electrode.

Into the positive electrode or the negative electrode, a binding agent (also referred to as a binder) is mixed in order that active materials can be bound or an active material and a current collector can be bound. Since the binding agent is generally an organic high molecular compound such as polyvinylidene fluoride (PVDF) which has an insulating property, the electron conductivity of the binding agent is extremely low. Therefore, as the ratio of the mixed binding agent to the active material is increased, the amount of the active material in the electrode is relatively decreased, resulting in the lower discharge capacity of the secondary battery.

Hence, by mixture of a conductive additive such as acetylene black (AB) or a graphite particle, the electron conductivity between active materials or between an active material and a current collector can be improved. Thus, a positive electrode active material with high electron conductivity can be provided (see Patent Document 1).

REFERENCE

Patent Document 1: Japanese Published Patent Application No. 2002-110162

DISCLOSURE OF INVENTION

However, because acetylene black used as a conductive additive is a high-volume particle with an average particle diameter of several tens of nanometers to several hundreds of nanometers, contact between acetylene black and an active material hardly becomes surface contact and tends to be point contact. Consequently, contact resistance between the active material and the conductive additive is high. Further, if the amount of the conductive additive is increased so as to increase contact points between the active material and the conductive additive, the proportion of the amount of the active material in the electrode decreases, resulting in the lower discharge capacity of the battery.

In the case where graphite particles are used as a conductive additive, natural graphite is generally used in consideration of cost. In this case, iron, lead, copper, or the like contained as impurities in a graphite particle reacts with the active material or the current collector, which might reduce the potential or capacity of the battery.

Further, as particles of the active material become minuter, cohesion between the particles becomes stronger, which makes uniform dispersion in the binding agent or the conductive additive difficult. Consequently, a portion where active material particles are aggregated and densely present and a portion where active material particles are not aggregated and thinly present are locally generated. In the portion where active material particles are aggregated and to which the conductive additive is not mixed, the active material particles do not contribute to formation of the discharge capacity of the battery.

Therefore, in view of the foregoing problems, an object of one embodiment of the present invention is to provide a graphene oxide which is a raw material of a conductive additive used for an active material layer which achieves high electron conductivity with a small amount of a conductive additive. Another object is to provide, with a small amount of a conductive additive, a positive electrode for a nonaqueous secondary battery which is highly filled and includes a high-density positive electrode active material layer. Another object is to provide, using the positive electrode for a nonaqueous secondary battery, a nonaqueous secondary battery having high capacity per electrode volume.

A positive electrode for a nonaqueous secondary battery in accordance with one embodiment of the present invention includes a graphene as a conductive additive included in a positive electrode active material layer.

A graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, the graphene has been expected to be applied to a variety of fields of, for example, field-effect transistors with high mobility, highly sensitive sensors, highly-efficient solar cells, and next-generation transparent conductive films and has attracted a great deal of attention.

In this specification, the term graphene includes a single-layer graphene and multilayer graphenes including two to hundred layers. The single-layer graphene refers to a sheet of one atomic layer of carbon molecules having $\pi$ bonds. The graphene oxide refers to a compound formed by oxidation of such a graphene. Note that when a graphene oxide is reduced to form a graphene, oxygen contained in the graphene oxide is not entirely released and part of oxygen remains in the graphene. When the graphene contains oxygen, the proportion of oxygen is greater than or equal to 2 atomic % and less than or equal to 20 atomic %, preferably greater than or equal to 3 atomic % and less than or equal to 15 atomic %.

In the case where the graphene is multilayer graphenes including the graphene obtained by reducing the graphene oxide, the interlayer distance between the graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the secondary battery of one embodiment of the present invention is longer than that in general graphite, carrier ions can easily transfer between the graphenes in multilayer graphenes.

In a positive electrode for a nonaqueous secondary battery in accordance with one embodiment of the present invention, graphenes are overlapped with each other in a positive electrode active material layer and dispersed so as to be in contact with a plurality of positive electrode active material particles. In other words, a network for electron conduction is formed by the graphenes in a positive electrode active material layer. This maintains bonds between the plurality of positive electrode active material particles, which enables a positive electrode active material layer with high electron conductivity to be formed.

A positive electrode active material layer to which a graphene is added as a conductive additive can be manufactured by the following method. First, after the graphene is dispersed into a dispersion medium (also referred to as a solvent), a positive electrode active material is added thereto and a mixture is obtained by mixing. A binding agent (also referred to as a binder) is added to this mixture and mixing is performed, so that a positive electrode paste is formed. Lastly, after the positive electrode paste is applied on a positive electrode current collector, the dispersion medium is volatilized. Thus, the positive electrode active material layer to which the graphene is added as a conductive additive is manufactured.

In order that a network for electron conduction can be formed in a positive electrode active material layer with use of the graphene as a conductive additive, the graphene needs to be uniformly dispersed in the dispersion medium. Dispersibility in a dispersion medium directly depends on the dispersibility of the graphene in a positive electrode active material layer. When the dispersibility of the graphene is low, the graphene is aggregated in the positive electrode active material layer and localized, which prevents formation of the network. Thus the dispersibility of the graphene used as a conductive additive in a dispersion medium is an extremely important factor in the improvement of the electron conductivity of the positive electrode active material layer.

By examining a positive electrode active material layer formed in such a way that a graphene as a conductive additive was put in a dispersion medium together with an active material and a binding agent, the present inventors found that dispersibility was insufficient and a network for electron conduction was not formed in the positive electrode active material layer. The inventors found the same results by examining a positive electrode active material layer formed in such a way that, instead of a graphene, a graphene formed by reduction of a graphene oxide (hereinafter, referred to as an RGO (an abbreviation of reduced graphene oxide)) was put as a conductive additive in a dispersion medium.

In contrast, the present inventors have found that excellent electron conductivity is achieved by formation of a network for electron conduction in a positive electrode active material layer obtained in such a way that, after a graphene oxide (also referred to as a GO) as a conductive additive is put in a dispersion medium together with an active material and a binding agent to form a positive electrode paste, the dispersed graphene oxide is reduced by heat treatment to form a graphene.

Thus, while dispersibility is low in a positive electrode active material layer in which a graphene or a RGO is dispersed as a raw material of a conductive additive, high dispersibility is achieved with a graphene formed by reduction performed after a graphene oxide is added to form a positive electrode paste.

Such a difference in the dispersibility in an active material layer between the graphene or RGO and the graphene formed by reduction performed after a positive electrode paste including a graphene oxide is formed can be explained below as a difference in the dispersibility in a dispersion medium.

FIG. 1A illustrates a structural formula of NMP (also referred to as N-methylpyrrolidone, 1-methyl-2-pyrrolidone, N-methyl-2-pyrrolidone, or the like), which is a typical dispersion medium. An NMP 100 is a compound having a five-membered ring structure and is one of polar solvents. As illustrated in FIG. 1A, in the NMP, oxygen is electrically negatively biased and carbon forming a double bond with the oxygen is electrically positively biased. A graphene, an RGO, or a graphene oxide is added to a diluent solvent having such a polarity.

The graphene is a crystal structure body of carbon in which hexagonal skeletons are spread in a planar form as already described, and does not substantially include a functional group in the structure body. Further, the RGO is formed by reduction of functional groups originally included in the RGO by heat treatment, and the proportion of functional groups in the structure body is as low as about 10 wt %. Consequently, as illustrated in FIG. 1B, a surface of a graphene or RGO 101 does not have polarity and therefore has hydrophobicity. Therefore it is considered that, while interaction between the NMP 100 which is a dispersion medium and the graphene or RGO 101 is extremely weak, interaction occurs between the graphenes or RGOs 101 to cause aggregation of the graphenes or RGOs 101 (see FIG. 1C).

A graphene oxide 102 is a polar substance having a functional group such as an epoxy group, a carbonyl group, a carboxyl group, or a hydroxyl group. Oxygen in the functional group in the graphene oxide 102 is negatively charged; hence, graphene oxides hardly aggregate in a polar solvent but strongly interact with the NMP 100 which is a polar solvent (see FIG. 2A). Thus, as illustrated in FIG. 2B, the functional group such as an epoxy group included in the graphene oxide 102 interacts with a polar solvent, which inhibits aggregation among graphene oxides; consequently, the graphene oxide 102 is considered to be uniformly dispersed in a dispersion medium (see FIG. 2B).

In view of the foregoing, in order that a network with high electron conductivity be formed in a positive electrode active material layer by using the graphene as a conductive additive, use of the graphene oxide with high dispersibility in a dispersion medium in manufacture of a positive electrode paste is very effective. The dispersibility of the graphene oxide in a dispersion medium is considered to depend on the quantity of functional groups having oxygen such as an epoxy group (i.e., the degree of oxidation of the graphene oxide).

One embodiment of the present invention is a graphene oxide used as a raw material of a conductive additive in a positive electrode for a nonaqueous secondary battery. In the graphene oxide, the atomic ratio of oxygen to carbon is greater than or equal to 0.405.

Here, the atomic ratio of oxygen to carbon is an indicator of the degree of oxidation and represents the atomic ratio of oxygen which is a constituent element of the graphene oxide as a proportion with respect to the atomic ratio of carbon which is a constituent element of the graphene oxide. Note that the atomic ratio of elements included in the graphene oxide can be measured by X-ray photoelectron spectroscopy (XPS), for example.

The atomic ratio of oxygen to carbon in the graphene oxide which is greater than or equal to 0.405 means that the graphene oxide is a polar substance in which functional groups such as an epoxy group, a carbonyl group, a carboxyl group, or a hydroxyl group are sufficiently bonded to the graphene oxide for the high dispersibility of the graphene oxide in a polar solvent.

The graphene oxide in which the atomic ratio of oxygen to carbon is greater than or equal to 0.405 is dispersed in a dispersion medium together with a positive electrode active material and a binding agent, the mixture is mixed, the mixture is applied on a positive electrode current collector, and heating are performed. Thus, a positive electrode for a nonaqueous secondary battery which includes a graphene with high dispersibility and a network for electron conduction can be formed.

The length of one side of the graphene oxide is preferably greater than or equal to 50 nm and less than or equal to 100 μm, more preferably greater than or equal to 800 nm and less than or equal to 20 μm.

Another embodiment of the present invention is a positive electrode for a nonaqueous secondary battery which includes a positive electrode active material layer including a plurality of positive electrode active material particles, a conductive additive including a plurality of graphenes, and a binding agent over a positive electrode current collector. Each of the graphenes is larger than an average particle diameter of each of the positive electrode active material particles. Each of the graphenes is dispersed in the positive electrode active material layer such that the graphene makes surface contact with one or more graphenes adjacent to the graphene. The graphenes make surface contact in such a way as to wrap part of surfaces of the positive electrode active material particles.

As already described, the graphene oxides are structure bodies having functional groups including oxygen and therefore do not aggregate and are uniformly dispersed in a polar solvent such as NMP. The dispersed graphene oxides uniformly mix with the plurality of positive electrode active material particles. Thus, the graphenes, which are formed from the graphene oxide by volatilization of the dispersion medium and reduction treatment of the graphene oxide, are dispersed in the positive electrode active material layer such that the graphenes make surface contact with each other. Since the graphene has a sheet-like shape and partial surface contact between the graphenes achieves electrical connection, a network for electron conduction is considered to be formed when some graphenes are viewed as one set. Further, the surface contact between the graphenes can keep contact resistance low, which leads to the formation of the network with high electron conductivity.

Further, since the graphene is a sheet whose side has a length greater than or equal to 50 nm and less than or equal to 100 μm, preferably greater than or equal to 800 nm and less than or equal to 20 μm, which is larger than an average particle diameter of the positive electrode active material particles, the graphene in the form of a sheet can be connected to the plurality of positive electrode active material particles. In particular, since the graphene has a sheet-like shape, surface contact can be made in such a way as to wrap the surfaces of the positive electrode active material particles. Accordingly, without an increase in the amount of conductive additive, contact resistance between the positive electrode active material particles and the graphenes can be reduced.

Note that as the positive electrode active material particles, a material capable of inserting and extracting of carrier ions, such as lithium iron phosphate, can be used.

Another embodiment of the present invention is a positive electrode for a nonaqueous secondary battery which includes a positive electrode active material layer including a plurality of positive electrode active material particles, a conductive additive including a plurality of graphenes, and a binding agent over a positive electrode current collector. As bonding states of carbon included in the positive electrode active material layer, the proportion of a C=C bond is greater than or equal to 35% and the proportion of a C—O bond is greater than or equal to 5% and less than or equal to 20%.

Another embodiment of the present invention is a method of manufacturing a positive electrode for a nonaqueous secondary battery, which includes the steps of: dispersing a graphene oxide in which the atomic ratio of oxygen to carbon is greater than or equal to 0.405 into a dispersion medium; adding a positive electrode active material to the dispersion medium into which the graphene oxide is dispersed and performing mixing to form a mixture; adding a binding agent to the mixture and performing mixing to form a positive electrode paste; applying the positive electrode paste on a positive electrode current collector; and reducing the graphene oxide after or at the same time when the dispersion medium included in the applied positive electrode paste is volatilized, whereby a positive electrode active material layer including the graphene is formed over the positive electrode current collector.

The length of one side of each of the graphene oxide and the graphene is preferably greater than or equal to 50 nm and less than or equal to 100 μm, more preferably greater than or equal to 800 nm and less than or equal to 20 μm.

In the above manufacturing method, the positive electrode paste is dried under a reducing atmosphere or reduced pressure. This enables the dispersion medium included in the positive electrode paste to be volatilized and the graphene oxide included in the positive electrode paste to be reduced.

In the above manufacturing method, by further addition of a dispersion medium at the time when the binding agent is added to the mixture and mixing is performed, the viscosity of the positive electrode paste can be adjusted.

The positive electrode active material is added to the dispersion medium in which the graphene oxide with an atomic ratio of oxygen to carbon greater than or equal to 0.405 is dispersed. The resulting substance is mixed, so that the positive electrode active material layer with high dispersibility of the graphene is formed. The graphene oxide can be included at least at 2 wt % with respect to the total weight of the positive electrode paste which is a mixture of the positive electrode active material, the conductive additive, and the binding agent. Further, the graphene obtained after the positive electrode paste is applied on the current collector and reduction is performed can be included at least at 1 wt % with respect to the total weight of the positive electrode active material layer. This is because the weight of the graphene is reduced by almost half due to the reduction of the graphene oxide.

Specifically, it is preferable that, in the state of the positive electrode paste, the graphene oxide be added at greater than or equal to 2 wt % and less than or equal to 10 wt %, the positive electrode active material be added at greater than or equal to 85 wt % and less than or equal to 93 wt %, and the binding agent be added at greater than or equal to 1 wt % and less than or equal to 5 wt %, with respect to the total weight of the positive electrode paste. Further, it is preferable that, in the state of the positive electrode active material layer obtained by applying the positive electrode paste on the current collector and reducing the graphene oxide, the graphene be added at greater than or equal to 1 wt % and less than or equal to 5 wt %, the positive electrode active material be added at greater than or equal to 90 wt % and less than or equal to 94 wt %, and the binding agent be added at greater than or equal to 1 wt % and less than or equal to 5 wt %, with respect to the total weight of the positive electrode active material layer.

After the positive electrode paste is applied on the positive electrode current collector, oxygen is released from the graphene oxide by drying under a reducing atmosphere or reduced pressure, so that the positive electrode active material layer including the graphene can be formed. Note that oxygen included in the graphene oxide is not entirely released and may partly remain in the graphene.

When the graphene includes oxygen, the proportion of oxygen is greater than or equal to 2 atomic % and less than or equal to 20 atomic %, preferably greater than or equal to 3 atomic % and less than or equal to 15 atomic %. As the proportion of oxygen is lower, the conductivity of the graphene can be higher, so that a network with high electron conductivity can be formed. As the proportion of oxygen is higher, more openings serving as paths of ions can be formed in the graphene.

By using the positive electrode formed in the above-described manner, a negative electrode, an electrolyte solution, and a separator, a nonaqueous secondary battery can be manufactured.

A graphene oxide which is a raw material of a conductive additive used for an active material layer which achieves high electron conductivity can be provided with a small amount of a conductive additive.

By using the graphene oxide as a raw material of a conductive additive, a positive electrode for a nonaqueous secondary battery including a positive electrode active material layer which can achieve high electron conductivity can be provided with a small amount of a conductive additive. A high-density positive electrode for a nonaqueous secondary battery which includes a positive electrode active material layer which is highly filled can be provided with a small amount of a conductive additive.

By using the positive electrode for a nonaqueous secondary battery, a nonaqueous secondary battery having high capacity per electrode volume can be provided.

BRIEF DESCRIPTION OF DRAWINGS

In the accompanying drawings:

FIG. 4 is a flow chart illustrating a method of forming a positive electrode;

FIGS. 8A and 8B illustrate a cylindrical secondary battery;

BEST MODE FOR CARRYING OUT THE INVENTION

Figure 1A:
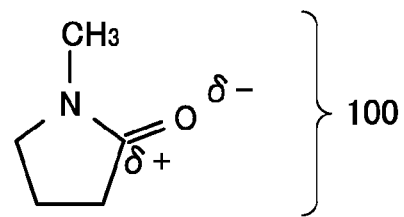
FIGS. 1A to 1C each illustrate a dispersion state in a polar solvent.
Figure 1B:
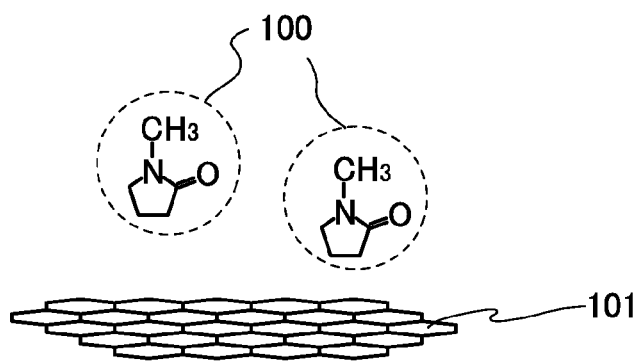
Figure 1C:
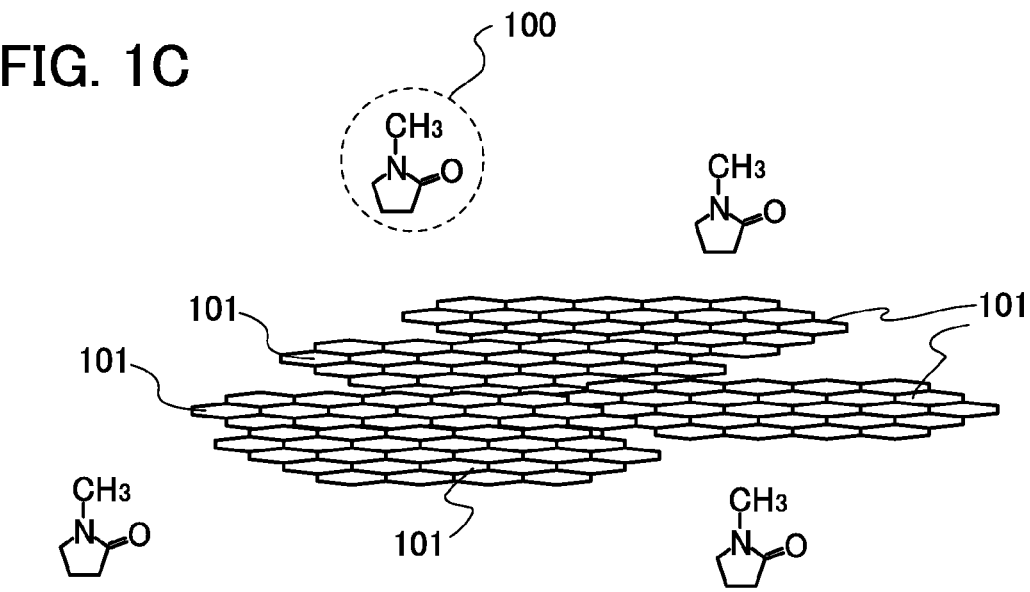
Figure 2A:
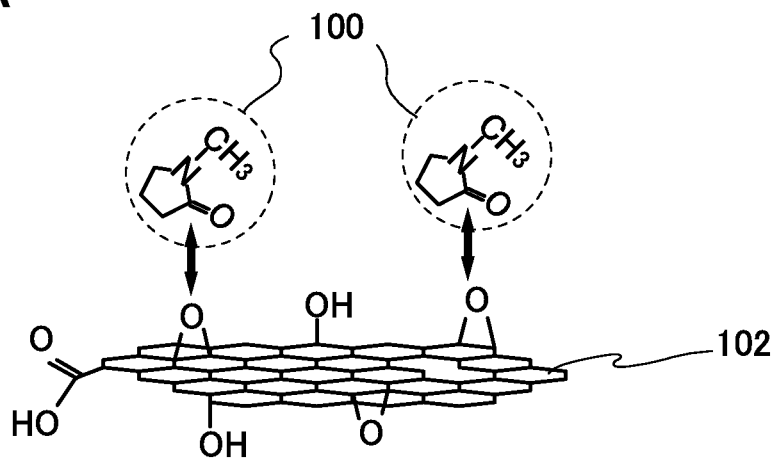
FIGS. 2A and 2B each illustrate a dispersion state in a polar solvent.
Figure 2B:
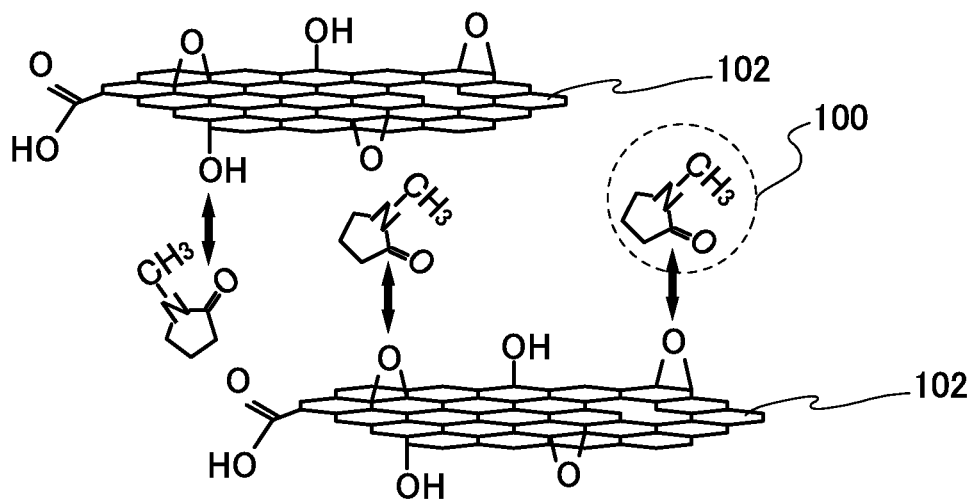

Hereinafter, embodiments will be described with reference to the accompanying drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in each drawing described in this specification, the size, the film thickness, or the region of each component is exaggerated for clarity in some cases. Therefore, embodiments of the present invention are not limited to such scales in the drawings.

Embodiment 1

Figure 3A:
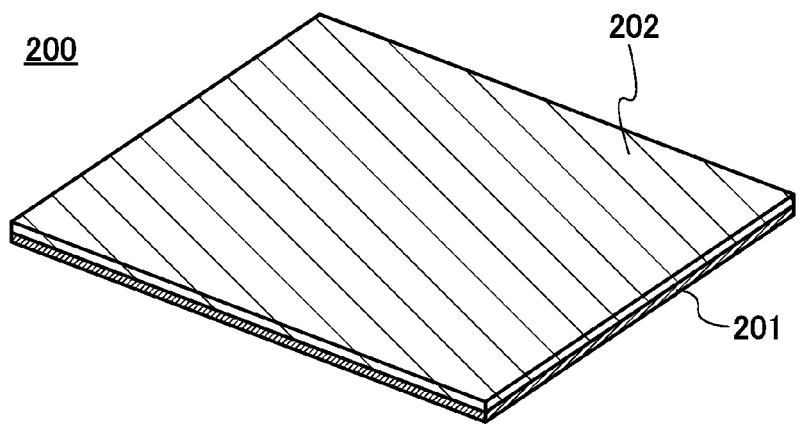
FIGS. 3A to 3C illustrate a positive electrode.
Figure 19:
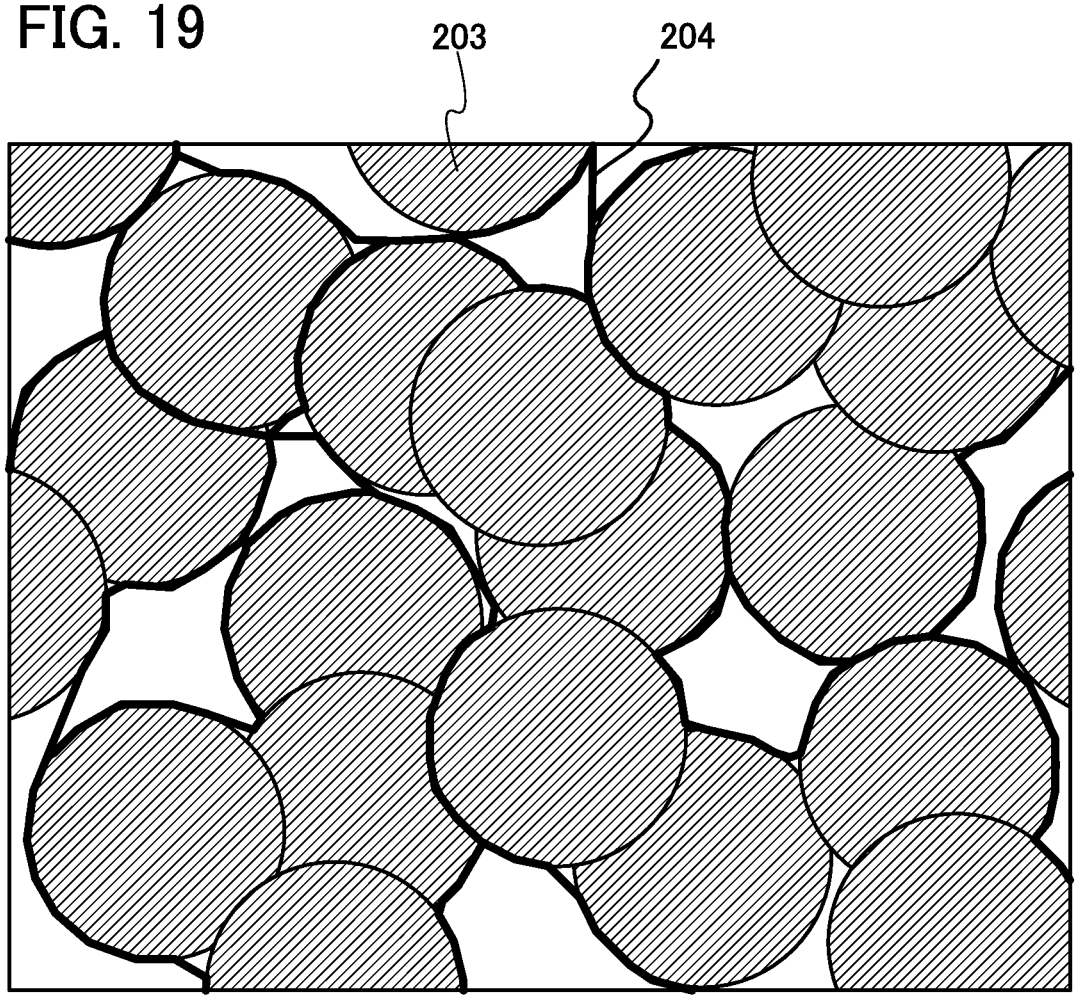
FIG. 19 illustrates a positive electrode.

In this embodiment, a positive electrode for a nonaqueous secondary battery in accordance with one embodiment of the present invention is described with reference to FIGS. 3A to 3C and FIG. 19. FIG. 3A is a perspective view of the positive electrode, FIG. 3B is a plan view of a positive electrode active material layer, and FIG. 3C and FIG. 19 are longitudinal sectional views of the positive electrode active material layer.

FIG. 3A is a perspective view of a positive electrode 200. Although the positive electrode 200 in the shape of a rectangular sheet is illustrated in FIG. 3A, there is no limitation on the shape of the positive electrode 200 and any appropriate shape can be selected. The positive electrode 200 is formed in such a manner that a positive electrode paste is applied on a positive electrode current collector 201 and then dried under a reducing atmosphere or reduced pressure to form a positive electrode active material layer 202. The positive electrode active material layer 202 is formed over only one surface of the positive electrode current collector 201 in FIG. 3A but may be formed over both surfaces of the positive electrode current collector 201. The positive electrode active material layer 202 is not necessarily formed over the entire surface of the positive electrode current collector 201 and a region that is not coated, such as a region for connection to a positive electrode tab, is provided as appropriate.

The positive electrode current collector 201 can be formed using a material that has high conductivity and is not alloyed with a carrier ion of lithium or the like, such as a metal typified by stainless steel, gold, platinum, zinc, iron, copper, aluminum, or titanium, or an alloy thereof. The positive electrode current collector 201 can be formed using an aluminum alloy to which an element which improves heat resistance, such as silicon, titanium, neodymium, scandium, or molybdenum, is added. Alternatively, a metal element which forms silicide by reacting with silicon may be used. Examples of the metal element which forms silicide by reacting with silicon are zirconium, titanium, hafnium, vanadium, niobium, tantalum, chromium, molybdenum, tungsten, cobalt, nickel, and the like. The positive electrode current collector 201 can have a foil-like shape, a plate-like shape (sheet-like shape), a net-like shape, a punching-metal shape, an expanded-metal shape, or the like as appropriate. The positive electrode current collector 201 preferably has a thickness greater than or equal to 10 µm and less than or equal to 30 µm.

Figure 3B:
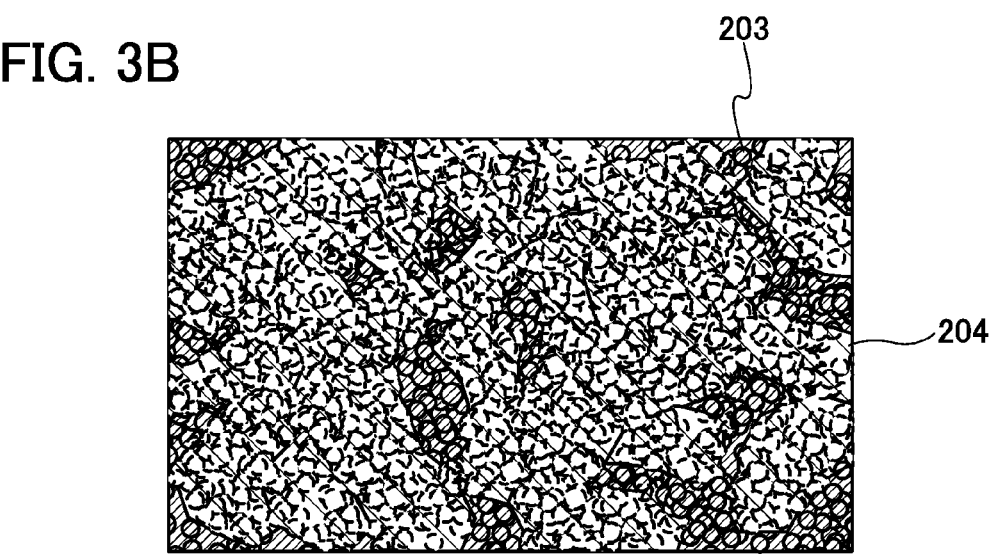
Figure 3C:
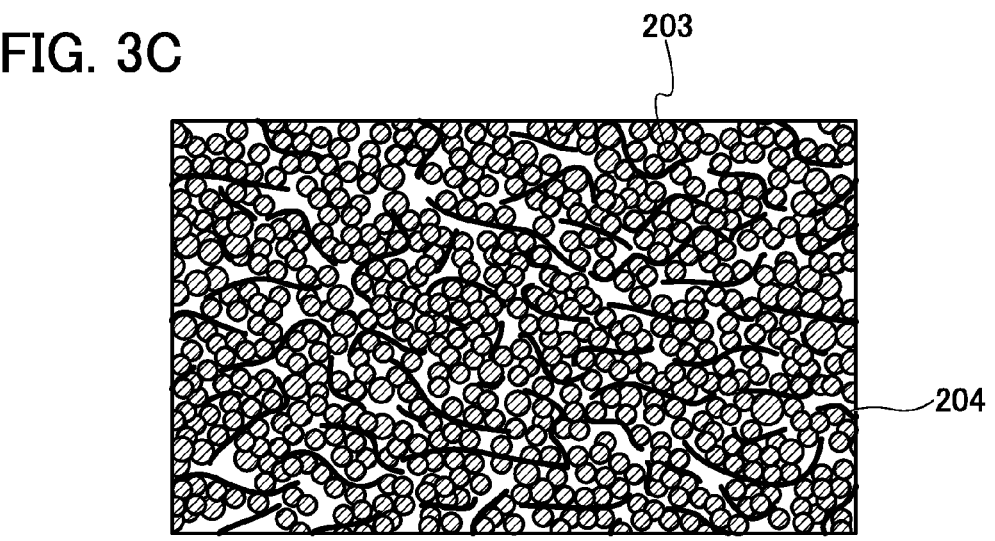

FIGS. 3B and 3C are schematic views illustrating a top view and a longitudinal section, respectively, of the positive electrode active material layer 202. The positive electrode active material layer 202 includes positive electrode active material particles 203, graphenes 204 as a conductive additive, and a binding agent (also referred to as a binder) (not shown).

The positive electrode active material particle 203 is in the form of particles made of secondary particles having average particle diameter or particle diameter distribution, which is obtained in such a way that material compounds are mixed at a predetermined ratio and baked and the resulting baked product is crushed, granulated, and classified by an appropriate means. Therefore the positive electrode active material particles 203 are schematically illustrated as spheres in FIGS. 3B and 3C but this shape does not limit the present invention.

As the positive electrode active material particle 203, a material into/from which lithium ions can be intercalated/deintercalated can be used; for example, a lithium-containing composite oxide with an olivine crystal structure, a layered rock-salt crystal structure, or a spinel crystal structure can be used.

An example of an olivine-type lithium-containing composite oxide is $LiMPO_4$ (general formula) (M is one or more of Fe(II), Mn(II), Co(II), and Ni(II)). Typical examples of $LiMPO_4$ (general formula) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

In particular, $LiFePO_4$ is preferable because it properly satisfies conditions necessary for the positive electrode active material particle, such as safety, stability, high capacity density, high potential, and the existence of lithium ions which can be extracted in initial oxidation (charging).

Examples of a lithium-containing composite oxide with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ (0<x<1)) such as $LiNi_{0.8}Co_{0.2}O_2$, NiMn-containing composite oxide (general formula: $LiNi_xMn_{1-x}O_2$ (0<x<1)) such as $LiNi_{0.5}Mn_{0.5}O_2$, NiMnCo-containing composite oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Cu_{0.15}Al_{0.05})O_2$, $Li_2MnO_3$—$LiMO_2$ (M=Co, Ni, or Mn), and the like.

In particular, $LiCoO_2$ is preferable because of its advantages such as high capacity and stability in the air higher than that of $LiNiO_2$ and thermal stability higher than that of $LiNiO_2$.

Examples of a lithium-containing composite oxide with a spinel crystal structure are $LiMn_2O_4$, $Li_{1+x}Mn_{2-x}O_4$, $Li(MnAl)_2O_4$, and $LiMn_{1.5}Ni_{0.5}O_4$, and the like.

It is preferable to add a small amount of lithium nickel oxide ($LiNiO_2$ or $LiNi_{1-x}MO_2$ (M=Co, Al, or the like)) to lithium-containing composite oxide with a spinel crystal structure which contains manganese such as $LiMn_2O_4$ because advantages such as minimization of the elution of manganese and the decomposition of an electrolytic solution can be obtained.

Alternatively, a composite oxide expressed by $Li_{(2-j)}MSiO_4$ (general formula) (M is one or more of Fe(II), Mn(II), Co(II), and Ni(II), 0≤j≤2) can be used as the positive electrode active material particle. Typical examples of $Li_{(2-j)}MSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0≤m≤1, 0<n<1, and 0<q<1), $Li_{(2-j)}Fe_rNi_sCo_tMn_uSiO_4$ (r+s+t+u≤1, 0<r<1, 0<s<1, 0<t<1, and 0<u<1), and the like.

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material particle. Examples of the nasicon compound are $Fe_2(MnO_4)_3$, $Fe_2(SO_4)_3$, $Li_3Fe_2(PO_4)_3$, and the like. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a lithium-containing composite oxide with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material particle.

In the case where carrier ions are alkali metal ions other than lithium ions, alkaline-earth metal ions, beryllium ions, or magnesium ions, the positive electrode active material particle may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Further, the graphenes 204 added as a conductive additive to the positive electrode active material layer 202 are formed by reduction treatment of a graphene oxide in which the atomic ratio of oxygen to carbon is greater than or equal to 0.405.

The graphene oxide in which the atomic ratio of oxygen to carbon is greater than or equal to 0.405 can be formed by an oxidation method called a Hummers method.

The Hummers method is as follows: a sulfuric acid solution of potassium permanganate, a hydrogen peroxide solution, or the like is mixed into a graphite powder to cause oxidation reaction; thus, a dispersion liquid including a graphite oxide is formed. Through the oxidation of carbon of graphite, functional groups such as an epoxy group, a carbonyl group, a carboxyl group, or a hydroxyl group are bonded in the graphite oxide. Accordingly, the interlayer distance between a plurality of graphenes in the graphite oxide is long as compared to the graphite, so that the graphite oxide can be easily separated into thin pieces by interlayer separation. Then, ultrasonic vibration is applied to the dispersion liquid including the graphite oxide, so that the graphite oxide whose interlayer distance is long can be cleaved to separate a graphene oxide and to form a dispersion liquid containing a graphene oxide. The solvent is removed from the dispersion liquid including the graphene oxide, so that a powdery graphene oxide can be obtained.

Here, the amount of an oxidizer such as potassium permanganate is adjusted as appropriate so that the graphene oxide in which the atomic ratio of oxygen to carbon is greater than or equal to 0.405 can be formed. Specifically, the ratio of the amount of an oxidizer to the amount of a graphite powder is increased, and accordingly the degree of oxidation of the graphene oxide (the atomic ratio of oxygen to carbon) can be increased. Therefore, in accordance with the amount of the graphene oxide to be produced, the ratio of the amount of an oxidizer to the amount of a graphite powder which is a raw material can be determined.

For the production of the graphene oxide, the present invention is not limited to the Hummers method using a sulfuric acid solution of potassium permanganate; for example, the Hummers method using nitric acid, potassium chlorate, nitric acid sodium, or the like or a method of producing the graphene oxide other than the Hummers method may be employed as appropriate.

The graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In the graphene oxide, oxygen in a functional group is negatively charged in a polar solvent typified by NMP; therefore, while interacting with NMP, the graphene oxide repels with other graphene oxides and is hardly aggregated. Accordingly, in a polar solvent, graphene oxides can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average particle diameter of the positive electrode active material particles 203, surface contact with the plurality of positive electrode active material particles 203 and connection among graphenes become difficult, resulting in difficulty in improving the electron conductivity of the positive electrode active material layer 202.

As in the top view of the positive electrode active material layer 202 in FIG. 3B, the plurality of positive electrode active material particles 203 is coated with the plurality of graphenes 204. The sheet-like graphene 204 is connected to the plurality of positive electrode active material particles 203. In particular, since the graphenes 204 are in the form of a sheet, surface contact can be made in such a way that the graphenes 204 wrap part of surfaces of the positive electrode active material particles 203. Unlike a conductive additive in the form of particles such as acetylene black, which makes point contact with a positive electrode active material, the graphenes 204 are capable of surface contact with low contact resistance; accordingly, the electron conductivity of the positive electrode active material particles 203 and the graphenes 204 can be improved without an increase in the amount of a conductive additive.

Further, surface contact is made between the plurality of graphenes 204. This is because the graphene oxides with extremely high dispersibility in a polar solvent are used for the formation of the graphenes 204. The solvent is removed by volatilization from a dispersion medium including the graphene oxides uniformly dispersed and the graphene oxides are reduced to give the graphenes; hence, the graphenes 204 remaining in the positive electrode active material layer 202 are partly overlapped with each other and dispersed such that surface contact is made, thereby forming a path for electron conduction.

In the top view of the positive electrode active material layer 202 in FIG. 3B, the graphenes 204 are not necessarily overlapped with another graphene over a surface of the positive electrode active material layer 202; the graphenes 204 are formed so as to be three-dimensionally arranged, for example, so as to enter the inside of the positive electrode active material layer 202. Further, the graphenes 204 are extremely thin films (sheets) made of a single layer of carbon molecules or stacked layers thereof and hence are over and in contact with part of the surfaces of the positive electrode active material particles 203 in such a way as to trace these surfaces. A portion of the graphenes 204 which is not in contact with the positive electrode active material particles 203 is warped between the plurality of positive electrode active material particles 203 and crimped or stretched.

The longitudinal section of the positive electrode active material layer 202 shows, as illustrated in FIG. 3C, substantially uniform dispersion of the sheet-like graphenes 204 in the positive electrode active material layer 202. The graphenes 204 are schematically shown as heavy lines in FIG. 3C but are actually thin films having a thickness corresponding to the thickness of a single layer or a multi-layer of carbon molecules. As in the top view of the positive electrode active material layer 202, the plurality of graphenes 204 are formed in such a way as to wrap or coat the plurality of positive electrode active material particles 203, so that the graphenes 204 make surface contact with the positive electrode active material particles 203. Furthermore, the graphenes 204 are also in surface contact with each other; consequently, the plurality of graphenes 204 forms a network for electron conduction. FIG. 19 is a schematic enlarged view of FIG. 3C. The graphenes 204 coat the surfaces of the plurality of positive electrode active material particles 203 in such a way as to cling to the surfaces and the graphenes are also in contact with each other, and thus the network is formed.

As illustrated in FIGS. 3B and 3C and FIG. 19, the plurality of sheet-like graphenes 204 is three-dimensionally dispersed in the positive electrode active material layer 202 and in surface contact with each other, which forms the three-dimensional network for electron conduction. Further, each graphene 204 coats and makes surface contact with the plurality of positive electrode active material particles 203. Thus, bond between the positive electrode active material particles 203 is maintained. As described above, the graphenes, whose raw material is the graphene oxide in which the atomic ratio of oxygen to carbon is greater than or equal to 0.405 and which are formed by reduction performed after a paste is formed, are employed as a conductive additive, so that the positive electrode active material layer 202 with high electron conductivity can be formed.

The proportion of the positive electrode active material particles 203 in the positive electrode active material layer 202 can be increased because the added amount of the conductive additive is not necessarily increased in order to increase contact points between the positive electrode active material particles 203 and the graphenes 204. Accordingly, the discharge capacity of the secondary battery can be increased.

The average particle diameter of the primary particle of the positive electrode active material particles 203 is less than or equal to 500 nm, preferably greater than or equal to 50 nm and less than or equal to 500 nm. To make surface contact with the plurality of graphenes of positive electrode active material particles 203, the graphenes 204 have sides the length of each of which is greater than or equal to 50 nm and less than or equal to 100 μm, preferably greater than or equal to 800 nm and less than or equal to 20 μm.

As the binding agent (binder) included in the positive electrode active material layer 202, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The above-described positive electrode active material layer 202 preferably includes the positive electrode active material particles 203 at greater than or equal to 90 wt % and less than or equal to 94 wt %, the graphenes 204 as a conductive additive at greater than or equal to 1 wt % and less than or equal to 5 wt %, and the binding agent at greater than or equal to 1 wt % and less than or equal to 5 wt % with respect to the total weight of the positive electrode active material layer 202.

As described in this embodiment, the graphenes 204 larger than the average particle diameter of the positive electrode active material particles 203 are dispersed in the positive electrode active material layer 202 such that one of the graphenes 204 makes surface contact with one or more graphenes 204 adjacent to the one of the graphenes 204, and the graphenes 204 make surface contact in such a way as to wrap the surfaces of the positive electrode active material particles 203. Consequently, with a small amount of a conductive additive, a positive electrode for a nonaqueous secondary battery which is highly filled and includes a high-density positive electrode active material layer can be provided.

This embodiment can be implemented combining with another embodiment as appropriate.

Embodiment 2

Next, a method of forming the positive electrode 200 including a positive electrode active material layer 202 is described with reference to FIG. 4. The method is as follows: a positive electrode paste is formed using the positive electrode active material, the conductive additive, the binding agent, and the dispersion medium described above, applied on the positive electrode current collector 201, and then dried under a reducing atmosphere or reduced pressure.

First, NMP is prepared as the dispersion medium (Step S11), and the graphene oxide in which the atomic ratio of oxygen to carbon is greater than or equal to 0.405 and which is described in Embodiment 1 is dispersed in NMP (Step S12). In the case where the weight of the graphene oxide is less than 2 wt % with respect to the total weight of the positive electrode paste, the conductivity is decreased when the positive electrode active material layer 202 is formed. In the case where the weight of the graphene oxide exceeds 10 wt %, although it depends on the diameter of the positive electrode active material particle, the viscosity of the positive electrode paste is increased. In addition, in a drying step after the positive electrode paste is applied on the positive electrode current collector 201, convection occurs in the positive electrode paste by heating and the graphene oxide which is thin and lightweight moves and is aggregated, whereby the positive electrode active material layer 202 might cause a crack or might be separated from the positive electrode current collector 201. Thus, the weight of the graphene oxide is preferably set to 2 wt % to 10 wt % with respect to the weight of the positive electrode paste (the total weight of the positive electrode active material, the conductive additive, and the binding agent). Note that the graphene oxide is reduced by a later heat treatment step to give the graphene and the weight is reduced by almost half, and consequently the weight ratio in the positive electrode active material layer 202 becomes 1 wt % to 5 wt %.

Next, lithium iron phosphate is added as the positive electrode active material (Step S13). It is preferable to use lithium iron phosphate with an average primary particle diameter greater than or equal to 50 nm and less than or equal to 500 nm. The weight of added lithium iron phosphate is preferably greater than or equal to 85 wt % with respect to the total weight of the positive electrode paste; for example, the weight is greater than or equal to 85 wt % and less than or equal to 93 wt %.

Note that when lithium iron phosphate is baked, a carbohydrate such as glucose may be mixed so that a particle of lithium iron phosphate is coated with carbon. This treatment improves the conductivity.

Next, a mixture of the above is kneaded (mixing is performed in a highly viscous state), so that the aggregation of the graphene oxide and lithium iron phosphate can be undone. Further, since the graphene oxide has a functional group, oxygen in the functional group is negatively charged in a polar solvent, which makes aggregation among different graphene oxides difficult. In addition, the graphene oxide strongly interacts with lithium iron phosphate. Hence, the graphene oxide can be uniformly dispersed into lithium iron phosphate.

Next, as the binding agent, PVDF is added to the mixture (Step S14). The weight of PVDF can be determined in accordance with the weight of the graphene oxide and lithium iron phosphate, and PVDF is preferably added to the positive electrode paste at greater than or equal to 1 wt % and less than or equal to 5 wt %. The binding agent is added while the graphene oxide is uniformly dispersed so as to make surface contact with the plurality of positive electrode active material particles, so that the positive electrode active material particles and the graphene oxide can be bound to each other while the dispersion state is maintained. Although the binding agent is not necessarily added depending on the proportions of lithium iron phosphate and the graphene oxide, adding the binding agent can enhance the strength of the positive electrode.

Next, NMP is added to this mixture until predetermined viscosity is obtained (Step S15) and mixed. Consequently, the positive electrode paste can be formed (Step S16). Through the above steps, the positive electrode paste in which the graphene oxide, the positive electrode active material particles, and the binding agent are uniformly mixed can be formed.

Next, the positive electrode paste is applied on the positive electrode current collector 201 (Step S17).

Next, the positive electrode paste applied on the positive electrode current collector 201 is dried (Step S18). The drying step is performed by heating at 60° C. to 170° C. for 1 minute to 10 hours to vaporize NMP. There is no particular limitation on the atmosphere.

Next, the positive electrode paste is dried under a reducing atmosphere or reduced pressure (Step S19). By heating at a temperature of 130° C. to 200° C. for 10 hours to 30 hours under a reducing atmosphere or reduced pressure, NMP and water which are left in the positive electrode paste are vaporized and oxygen contained in the graphene oxide is desorbed. Thus, the graphene oxide can be formed into graphene. Note that oxygen in the graphene oxide may partly remain in the graphene without being entirely released.

Through the above steps, the positive electrode 200 including the positive electrode active material layer 202 where the graphenes 204 are uniformly dispersed in the positive electrode active material particles 203 can be formed. Note that a step of applying pressure to the positive electrode 200 may be performed after the drying step.

As described in this embodiment, the graphene oxide can be uniformly dispersed in positive electrode active material particles by adding the positive electrode active material particles to a dispersion medium in which the graphene oxide with an atomic ratio of oxygen to carbon greater than or equal to 0.405 is dispersed and mixed. By being added in a state where the graphene oxide is dispersed so as to be in contact with the plurality of the positive electrode active material particles, the binding agent can be uniformly dispersed without hindering the contact between the graphene oxide and the plurality of positive electrode active material particles. With use of the positive electrode paste formed in such a manner, a positive electrode which is highly filled with the positive electrode active material and includes a high-density positive electrode active material layer can be manufactured. Further, when a battery is formed using the positive electrode, a nonaqueous secondary battery with high capacity can be formed. Since a state where the sheet-like graphenes are in contact with the plurality of positive electrode active material particles can be maintained by the binding agent, separation between the positive electrode active material and the graphene can be suppressed; thus, a nonaqueous secondary battery having good cycle characteristics can be manufactured.

This embodiment can be implemented combining with another embodiment as appropriate.

Embodiment 3

In this embodiment, a structure of a nonaqueous secondary battery and a manufacturing method thereof will be described with reference to FIGS. 5A and 5B and FIGS. 6A and 6B.

Figure 5A:
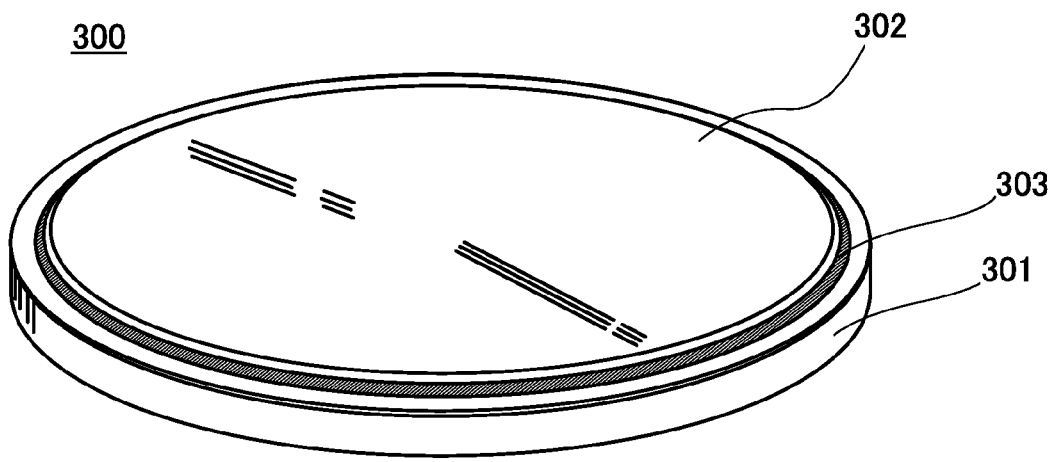
FIGS. 5A and 5B illustrate a coin-type secondary battery.
Figure 5B:
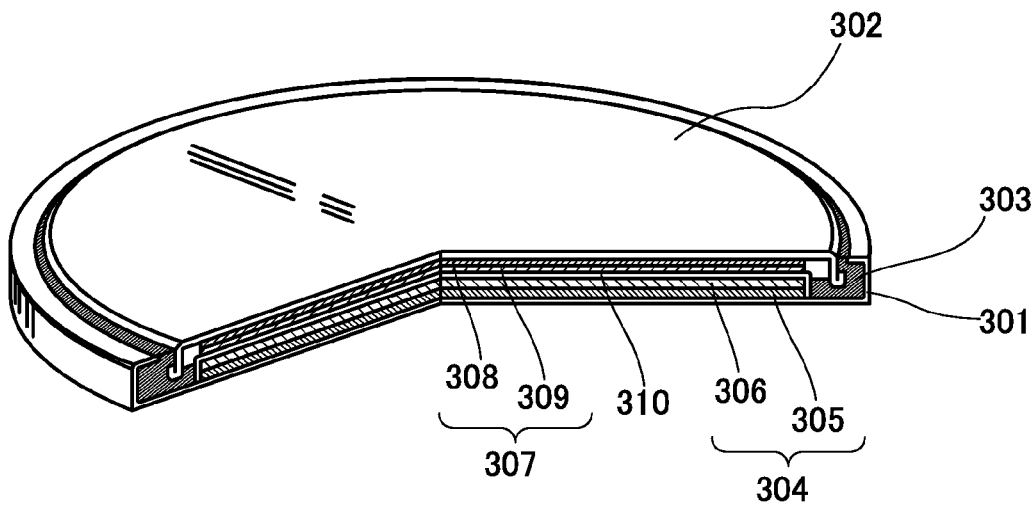

FIG. 5A is an external view of a coin-type (single-layer flat type) nonaqueous secondary battery, and FIG. 5B is a cross-sectional view thereof.

In a coin-type secondary battery 300, a positive electrode can 301 serving also as a positive electrode terminal and a negative electrode can 302 serving also as a negative electrode terminal are insulated and sealed with a gasket 303 formed of polypropylene or the like. A positive electrode 304 is formed of a positive electrode current collector 305 and a positive electrode active material layer 306 which is provided to be in contact with the positive electrode current collector 305. On the other hand, a negative electrode 307 is formed of a negative electrode current collector 308 and a negative electrode active material layer 309 which is provided to be in contact with the negative electrode current collector 308. A separator 310 and an electrolyte (not illustrated) are included between the positive electrode active material layer 306 and the negative electrode active material layer 309.

As the positive electrode 304, the positive electrode 200 described in Embodiment 1 and Embodiment 2 can be used.

The negative electrode 307 can be formed in such a manner that the negative electrode active material layer 309 is formed over the negative electrode current collector 308 by a CVD method, a sputtering method, or a coating method.

For the negative electrode current collector 308, it is possible to use a highly conductive material, for example, a metal such as aluminum, copper, nickel, or titanium, an aluminum-nickel alloy, or an aluminum-copper alloy. The negative electrode current collector 308 can have a foil-like shape, a plate-like shape (a sheet-like shape), a net-like shape, a punching-metal shape, an expanded-metal shape, or the like as appropriate. The negative electrode current collector 308 preferably has a thickness of greater than or equal to 10 μm and less than or equal to 30 μm.

As the negative electrode active material, a material with which lithium can be dissolved/precipitated or a material into/from which lithium ions can be intercalated/deintercalated can be used; for example, a lithium metal, a carbon-based material, an alloy-based material, or the like can be used.

The lithium metal is preferable because of its low redox potential (lower than that of the standard hydrogen electrode by 3.045 V) and high specific capacity per weight and volume (which are 3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (when a lithium-graphite intercalation compound is generated). For this reason, a lithium ion battery can have a high operating voltage. In addition, graphite is preferable because of its advantages such as relatively high capacity per volume, small volume expansion, low cost, and greater safety than that of a lithium metal.

As the negative electrode active material, an alloy-based material which enables charge-discharge reaction by alloying and dealloying reaction with a lithium metal can be used. For example, a material including at least one of Al, Si, Ge, Sn, Pb, Sb, Bi, Ag, Zn, Cd, In, Ga, and the like can be given. Such elements have higher capacity than carbon. In particular, silicon has a theoretical capacity of 4200 mAh/g, which is significantly high. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), molybdenum oxide ($MoO_2$), or the like can be used.

Further alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g).

A nitride containing lithium and a transition metal is preferably used, in which case lithium ions are included in the negative electrode active material, and thus the negative electrode active material can be used in combination with a material for a positive electrode active material which does not include lithium ions, such as $V_2O_5$ or $Cr_3O_8$. Note that in the case of using a material including lithium ions as the positive electrode active material, the nitride containing lithium and a transition metal can be used for the negative electrode active material by extracting lithium ions in advance.

Still further alternatively, as the negative electrode active material, a material which causes conversion reaction can be used. For example, a transition metal oxide which does not cause alloying reaction with lithium, such as cobalt oxide (CoO), nickel oxide (NiO), or iron oxide (FeO), may be used. Other examples of the material which causes conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 309 may be formed by a coating method in the following manner: a conductive additive or a binding agent is added to the negative electrode active material to form a negative electrode paste; and the negative electrode paste is applied on the negative electrode current collector 308 and dried.

In the case where the negative electrode active material layer 309 is formed using silicon as the negative electrode active material, graphene is preferably formed on a surface of the negative electrode active material layer 309. The volume of silicon is greatly changed due to occlusion/release of carrier ions in charge-discharge cycles, adhesion between the negative electrode current collector 308 and the negative electrode active material layer 309 is decreased, resulting in degradation of battery characteristics caused by charge and discharge. In view of this, graphene is preferably formed on a surface of the negative electrode active material layer 309 containing silicon because even when the volume of silicon is changed in charge-discharge cycles, decrease in adhesion between the negative electrode current collector 308 and the negative electrode active material layer 309 can be suppressed and degradation of battery characteristics is reduced.

Graphene formed on the surface of the negative electrode active material layer 309 can be formed by reducing graphene oxide in a similar manner to that of the method of forming the positive electrode. As the graphene oxide, the graphene oxide described in Embodiment 1 can be used.

A method of forming graphene oxide on the negative electrode active material layer 309 by an electrophoresis method will be described with reference to FIG. 6A.

Figure 6A:
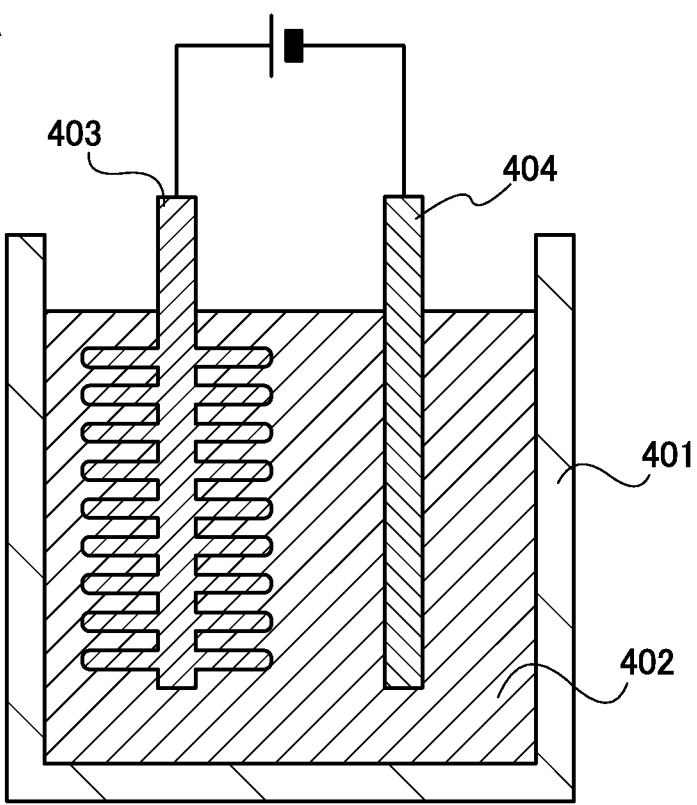
FIGS. 6A and 6B illustrate an electrophoresis method and an electrochemical reduction method, respectively.

FIG. 6A is a cross-sectional view illustrating an electrophoresis method. In a container 401, the dispersion liquid in which graphene oxide is dispersed and which is described in Embodiment 1 (hereinafter referred to as a graphene oxide dispersion liquid 402) is contained. Further, a formation subject 403 is put in the graphene oxide dispersion liquid 402 and is used as an anode. In addition, a conductor 404 serving as a cathode is put in the graphene oxide dispersion liquid 402. Note that the formation subject 403 is the negative electrode current collector 308 and the negative electrode active material layer 309 which is formed thereon. Further, the conductor 404 may be formed using a conductive material, for example, a metal material or an alloy material.

By applying appropriate voltage between the anode and the cathode, a graphene oxide layer is formed on a surface of the formation subject 403, that is, the surface of the negative electrode active material layer 309. This is because the graphene oxide is negatively charged in the polar solvent as described above, so that by applying voltage, the graphene oxide which is negatively charged is drawn to the anode and deposited on the formation subject 403. Negative charge of the graphene oxide is derived from release of hydrogen ions from a substituent such as a hydroxyl group or a carboxyl group included in the graphene oxide, and the substituent is bonded to an object to result in neutralization. Note that the voltage which is applied is not necessarily constant. Further, by measuring the amount of charge flowing between the anode and the cathode, the thickness of the graphene oxide layer deposited on the object can be estimated.

The voltage is applied between the cathode and the anode in the range of 0.5 V to 2.0 V, preferably 0.8 V to 1.5 V. For example, when the voltage applied between the cathode and the anode is set to 1 V, an oxide film which might be generated based on the principle of anodic oxidation is not easily formed between the formation subject and the graphene oxide layer.

When the graphene oxide with a required thickness is obtained, the formation subject 403 is taken out of the graphene oxide dispersion liquid 402 and dried.

In electrodeposition of the graphene oxide by an electrophoresis method, a portion which is already coated with the graphene oxide is scarcely stacked with an additional graphene oxide. This is because the conductivity of the graphene oxide is sufficiently low. On the other hand, a portion which is not coated yet with the graphene oxide is preferentially stacked with graphene oxide. Therefore, the graphene oxide formed on the surface of the formation subject 403 has a uniform thickness sufficient for practical use.

Time for performing electrophoresis (time for applying voltage) is preferably longer than time for coating the surface of the formation subject 403 with the graphene oxide, for example, longer than or equal to 0.5 minutes and shorter than or equal to 30 minutes, more preferably longer than or equal to 5 minutes and shorter than or equal to 20 minutes.

With the use of an electrophoresis method, an ionized graphene oxide can be electrically transferred to the active material, whereby the graphene oxide can be provided uniformly even when the surface of the negative electrode active material layer 309 is uneven.

Next, part of oxygen is released from the formed graphene oxide by reduction treatment. Although, as the reduction treatment, reduction treatment by heating or the like, which is described in Embodiment 1 using a graphene, may be performed, electrochemical reduction treatment (hereinafter, referred to as electrochemical reduction) will be described below.

Figure 6B:
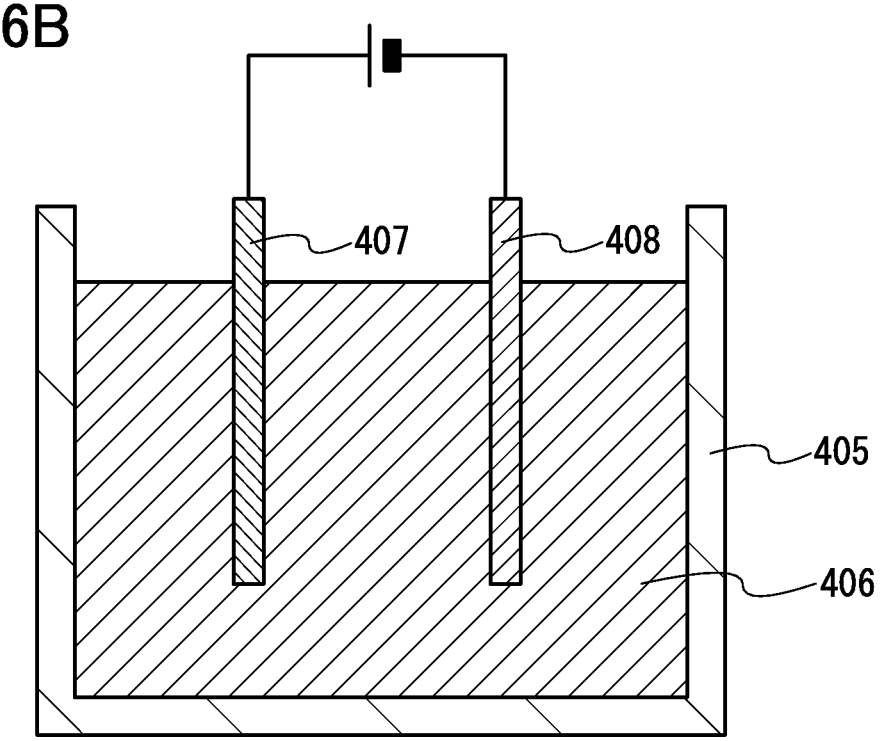

The electrochemical reduction of the graphene oxide is reduction utilizing electric energy, which is different from reduction by heat treatment. As illustrated in FIG. 6B, a closed circuit is configured using, as a conductor 407, the negative electrode including the graphene oxide provided over the negative electrode active material layer 309, and a potential at which the reduction reaction of the graphene oxide occurs or a potential at which the graphene oxide is reduced is supplied to the conductor 407, so that the graphene oxide is reduced to form graphene. Note that in this specification, a potential at which the reduction reaction of the graphene oxide occurs or a potential at which the graphene oxide is reduced is referred to as the reduction potential.

A method for reducing the graphene oxide will be specifically described with reference to FIG. 6B. A container 405 is filled with an electrolyte solution 406, and the conductor 407 provided with the graphene oxide and a counter electrode 408 are put in the container 405 so as to be immersed in the electrolyte solution 406. Next, an electrochemical cell (open circuit) is configured using at least the counter electrode 408 and the electrolyte solution 406 besides the conductor 407 provided with the graphene oxide, which serves as a working electrode, and the reduction potential of the graphene oxide is supplied to the conductor 407 (working electrode), so that the graphene oxide is reduced to form graphene. Note that the reduction potential to be supplied is a reduction potential in the case where the potential of the counter electrode 408 is used as a reference potential or a reduction potential in the case where a reference electrode is provided in the electrochemical cell and the potential of the reference electrode is used as a reference potential. For example, when the counter electrode 408 and the reference electrode are each made of lithium metal, the reduction potential to be supplied is a reduction potential determined relative to the redox potential of the lithium metal (vs. Li/Li$^+$). Through this step, reduction current flows through the electrochemical cell (closed circuit) when the graphene oxide is reduced. Thus, to examine whether the graphene oxide is reduced, the reduction current needs to be checked continuously; the state where the reduction current is below a certain value (where there is no peak corresponding to the reduction current) is regarded as the state where the graphene oxide is reduced (where the reduction reaction is completed).

In controlling the potential of the conductor 407, the potential of the conductor 407 may be fixed to less than or equal to the reduction potential of the graphene oxide or may be swept so as to include the reduction potential of the graphene oxide. Further, the sweeping may be periodically repeated like in cyclic voltammetry. There is no limitation on the sweep rate of the potential of the conductor 407. Note that the potential of the conductor 407 may be swept either from a higher potential to a lower potential or from a lower potential to a higher potential.

Although the reduction potential of the graphene oxide slightly varies depending on the structure of the graphene oxide (e.g., the presence or absence of a functional group) and the way to control the potential (e.g., the sweep rate), it is approximately 2.0 V (vs. Li/Li$^+$). Specifically, the potential of the conductor 407 may be controlled so as to fall within the range of 1.6 V to 2.4 V (vs. Li/Li$^+$).

Through the above steps, the graphene can be formed over the conductor 407. In the case where electrochemical reduction treatment is performed, a proportion of C(sp$^2$)-C(sp$^2$) double bonds is higher than that of the graphene formed by heat treatment; therefore, the graphene having high conductivity can be formed over the negative electrode active material layer 309.

The negative electrode active material layer 309 may be predoped with lithium through the graphene after the graphene is formed over the conductor 407. As a predoping method of lithium, a lithium layer may be formed on a surface of the negative electrode active material layer 309 by a sputtering method. Alternatively, a lithium foil is provided on the surface of the negative electrode active material layer 309, whereby the negative electrode active material layer 309 can be predoped with lithium.

The separator 310 can be formed using an insulator such as cellulose (paper), polyethylene with pores, or polypropylene with pores.

As an electrolyte of the electrolyte solution, a material which contains carrier ions is used. Typical examples of the electrolyte include lithium salts such as LiClO$_4$, LiAsF$_6$, LiBF$_4$, LiPF$_6$, and Li(C$_2$F$_5$SO$_2$)$_2$N.

In the case where carrier ions are alkali metal ions other than lithium ions, alkaline-earth metal ions, beryllium ions, or magnesium ions, the electrolyte may contain, instead of lithium in the lithium salts, an alkali metal (e.g., sodium or potassium), an alkaline-earth metal (e.g., calcium, strontium, or barium), beryllium, or magnesium.

As a solvent of the electrolyte solution, a material in which carrier ions can transfer is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled polymer material is used as the solvent of the electrolyte solution, safety against liquid leakage and the like is improved. Further, the nonaqueous secondary battery can be thinner and more lightweight. Typical examples of a gelled polymer material include a silicone gel, an acrylic gel, an acrylonitrile gel, polyethylene oxide, polypropylene oxide, and a fluorine-based polymer. Alternatively, the use of one or more of ionic liquids (room temperature molten salts) which are less likely to burn and volatilize as the solvent of the electrolyte solution can prevent the secondary battery from exploding or catching fire even when the secondary battery internally shorts out or the internal temperature increases due to overcharging or the like.

Instead of the electrolyte solution, a solid electrolyte including a sulfide-based inorganic material, an oxide-based inorganic material, or the like, or a solid electrolyte including a polyethylene oxide (PEO)-based polymer material or the like can be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistance property to a liquid (e.g., an electrolyte solution) in charging and discharging the secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the positive electrode 304 are electrically connected to each other, and the negative electrode can 302 and the negative electrode 307 are electrically connected to each other.

The negative electrode 307, the positive electrode 304, and the separator 310 are immersed in the electrolyte. Then, as illustrated in FIG. 5B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type secondary battery 300 is manufactured.

Next, an example of a laminated secondary battery will be described with reference to FIG. 7.

Figure 7:
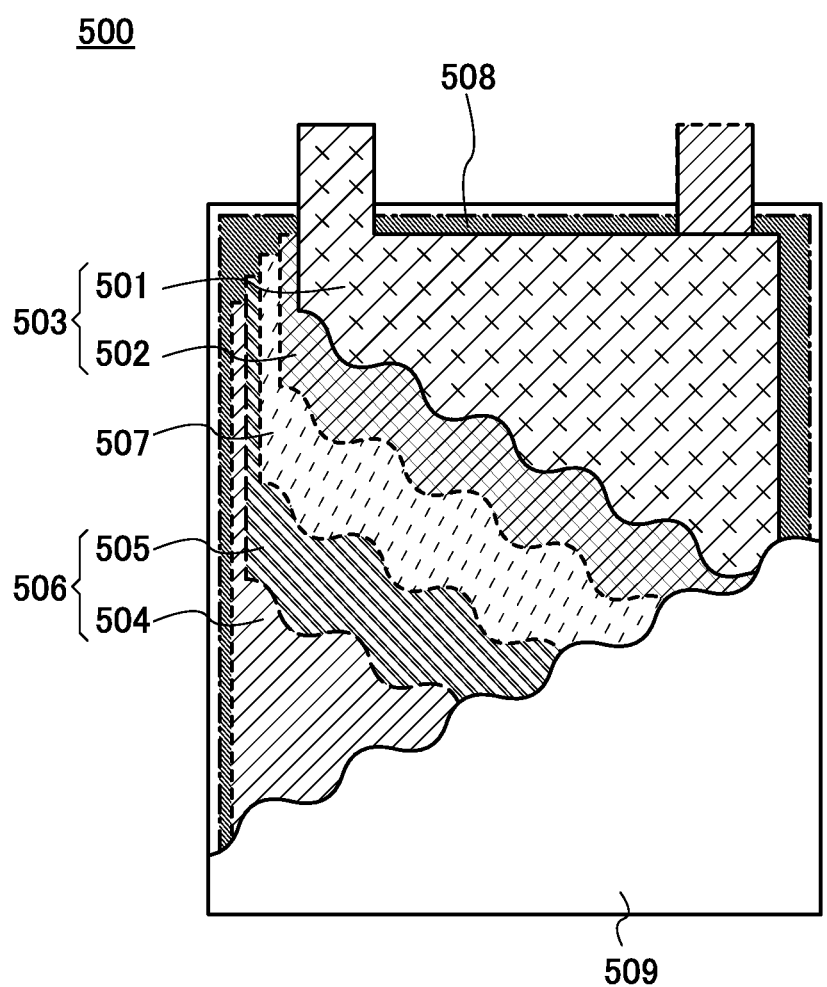
FIG. 7 illustrates a laminated secondary battery.

A laminated secondary battery 500 illustrated in FIG. 7 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is placed between the positive electrode 503 and the negative electrode 506 provided in the exterior body 509. The exterior body 509 is filled with the electrolyte solution 508.

In the laminated secondary battery 500 illustrated in FIG. 7, the positive electrode current collector 501 and the negative electrode current collector 504 also function as terminals for electrical contact with the outside. For this reason, each of the positive electrode current collector 501 and the negative electrode current collector 504 is arranged outside the exterior body 509 so as to be partly exposed.

In the laminated secondary battery 500, as the exterior body 509, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

Next, examples of a cylindrical secondary battery are described with reference to FIGS. 8A and 8B. As illustrated in FIG. 8A, a cylindrical lithium secondary battery 600 includes a positive electrode cap (battery lid) 601 on its top surface and a battery can (exterior can) 602 on its side surface and bottom surface. The positive electrode cap and the battery can (exterior can) 602 are insulated from each other by a gasket (insulating gasket) 610.

FIG. 8B is a diagram schematically illustrating a cross section of the cylindrical nonaqueous secondary battery. In the battery can 602 with a hollow cylindrical shape, a battery element is provided in which a strip-like positive electrode 604 and a strip-like negative electrode 606 are wound with a separator 605 provided therebetween. Although not illustrated, the battery element is wound around a center pin as a center. One end of the battery can 602 is close and the other end thereof is open. For the battery can 602, a metal having a corrosion-resistance property to a liquid (e.g., an electrolyte solution) in charging and discharging the secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 602, the battery element in which the positive electrode, the negative electrode, and the separator are wound is interposed between a pair of insulating plates 608 and 609 which face each other. Further, a non-aqueous electrolyte solution (not illustrated) is injected inside the battery can 602 in which the battery element is provided. A non-aqueous electrolyte solution which is similar to that of the coin-type nonaqueous secondary or the laminated nonaqueous secondary battery can be used.

Although the positive electrode 604 and the negative electrode 606 can be formed in a manner similar to that of the positive electrode and the negative electrode of the coin-type nonaqueous secondary battery, the difference lies in that, since the positive electrode and the negative electrode of the cylindrical nonaqueous secondary battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. A metal material such as aluminum can be used for both the positive electrode terminal 603 and the negative electrode terminal 607. The positive electrode terminal 603 is resistance-welded to a safety valve mechanism 612, and the negative electrode terminal 607 is resistance-welded to the bottom of the battery can 602. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery increases and exceeds a predetermined threshold value. The PTC element 611 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type non-aqueous secondary battery, the laminated nonaqueous secondary battery, and the cylindrical non-aqueous secondary battery are given as examples of the lithium secondary battery; however, any of non-aqueous secondary batteries with the other various shapes, such as a sealing-type non-aqueous secondary battery and a square-type non-aqueous secondary battery, can be used. Further, a structure in which a plurality of positive electrodes, a plurality of negative electrodes, and a plurality of separators are stacked or wound may be employed.

A positive electrode according to one embodiment of the present invention is used as each of the positive electrodes of the secondary batteries 300, 500, and 600 described in this embodiment. Thus, the discharge capacity of each of the secondary batteries 300, 500, and 600 can be increased.

This embodiment can be implemented combining with another embodiment as appropriate.

Embodiment 4

A nonaqueous secondary battery of one embodiment of the present invention can be used for power supplies of a variety of electrical appliances.

Specific examples of electrical appliances each utilizing the nonaqueous secondary battery of one embodiment of the present invention are as follows: display devices of televisions, monitors, and the like, lighting devices, desktop personal computers and laptop personal computers, word processors, image reproduction devices which reproduce still images or moving images stored in recording media such as digital versatile discs (DVDs), portable compact disc (CD) players, radio receivers, tape recorders, headphone stereos, stereos, clocks such as table clocks and wall clocks, cordless phone handsets, transceivers, portable wireless devices, cellular phones, car phones, portable game machines, calculators, portable information terminals, electronic notebooks, e-book readers, electronic translators, audio input devices, cameras such as still cameras and video cameras, toy, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using power from the nonaqueous secondary batteries are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, and spacecrafts.

In the above electrical appliances, the nonaqueous secondary battery of one embodiment of the present invention can be used as a main power supply for supplying enough power for almost the whole power consumption. Alternatively, in the above electrical appliances, the nonaqueous secondary battery of one embodiment of the present invention can be used as an uninterruptible power supply which can supply power to the electrical appliances when the supply of power from the main power supply or a commercial power supply is stopped. Still alternatively, in the above electrical appliances, the nonaqueous secondary battery of one embodiment of the present invention can be used as an auxiliary power supply for supplying power to the electrical appliances at the same time as the power supply from the main power supply or a commercial power supply.

Figure 9:
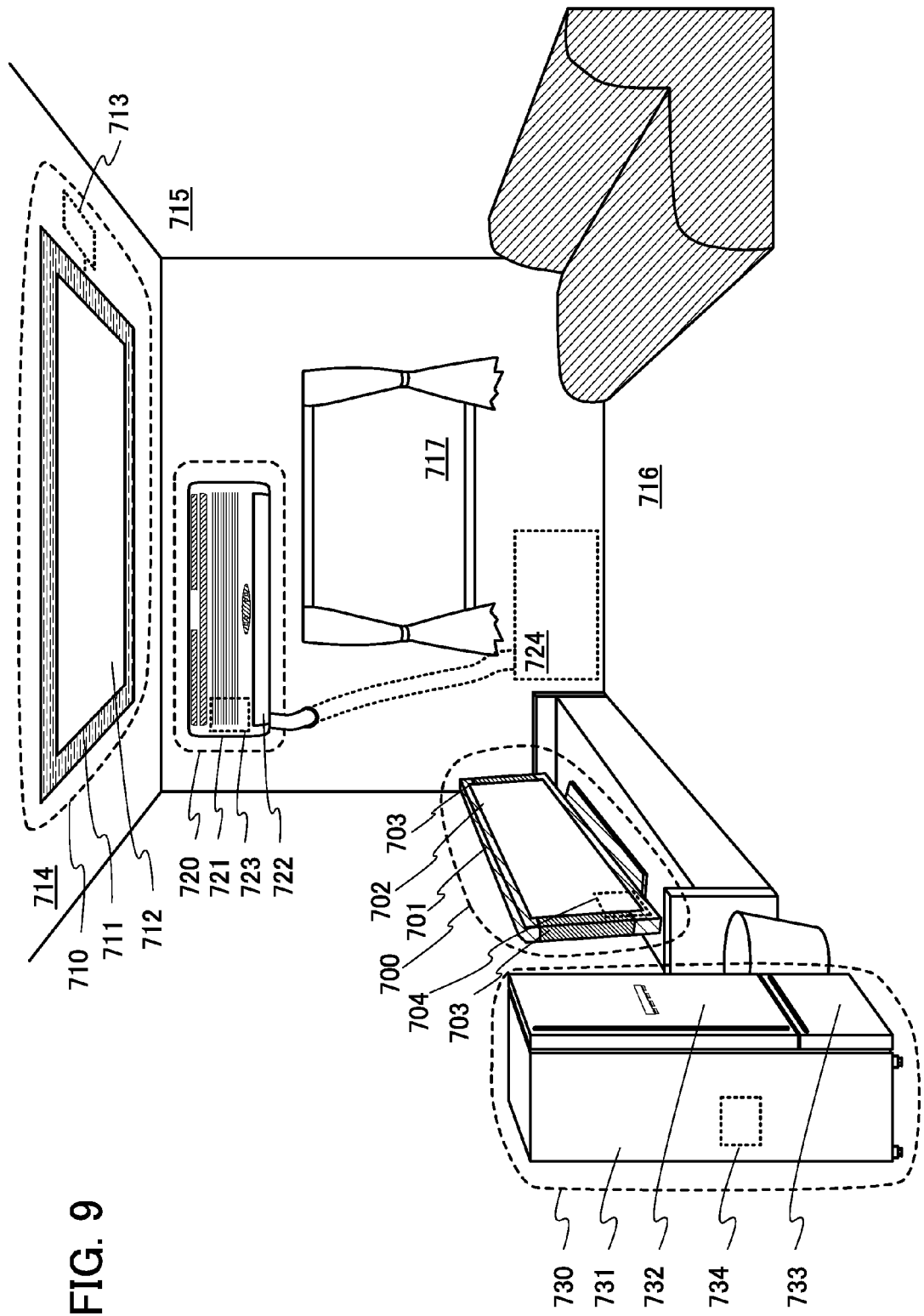
FIG. 9 illustrates electronic devices.

FIG. 9 illustrates specific structures of the above electrical appliances. In FIG. 9, a display device is an example of an electrical appliance including a nonaqueous secondary battery 704 of one embodiment of the present invention. Specifically, the display device 700 corresponds to a display device for TV broadcast reception and includes a housing 701, a display portion 702, speaker portions 703, the nonaqueous secondary battery 704, and the like. The nonaqueous secondary battery 704 of one embodiment of the present invention is provided in the housing 701. The display device 700 can receive power from a commercial power supply. Alternatively, the display device 700 can use power stored in the nonaqueous secondary battery 704. Thus, the display device 700 can be operated with the use of the nonaqueous secondary battery 704 of one embodiment of the present invention as an uninterruptible power supply even when power cannot be supplied from a commercial power supply due to power failure or the like.

For the display portion 702, a semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used.

Note that the display device includes, in its category, all of information display devices for personal computers, advertisement displays, and the like besides TV broadcast reception.

In FIG. 9, an installation lighting device 710 is an example of an electrical appliance including a nonaqueous secondary battery 713 of one embodiment of the present invention. Specifically, the lighting device 710 includes a housing 711, a light source 712, the nonaqueous secondary battery 713, and the like. Although FIG. 9 illustrates the case where the nonaqueous secondary battery 713 is provided in a ceiling 714 on which the housing 711 and the light source 712 are installed, the nonaqueous secondary battery 713 may be provided in the housing 711. The lighting device 710 can receive power from a commercial power supply. Alternatively, the lighting device 710 can use power stored in the nonaqueous secondary battery 713. Thus, the lighting device 710 can be operated with the use of the nonaqueous secondary battery 713 of one embodiment of the present invention as an uninterruptible power supply even when power cannot be supplied from a commercial power supply due to power failure or the like.

Note that although the installation lighting device 710 provided in the ceiling 714 is illustrated in FIG. 9 as an example, the nonaqueous secondary battery of one embodiment of the present invention can be used as an installation lighting device provided in, for example, a wall 715, a floor 716, a window 717, or the like other than the ceiling 714. Alternatively, the nonaqueous secondary battery can be used in a tabletop lighting device or the like.

As the light source 712, an artificial light source which emits light artificially by using power can be used. Specifically, an incandescent lamp, a discharge lamp such as a fluorescent lamp, and light-emitting elements such as an LED or an organic EL element are given as examples of the artificial light source.

In FIG. 9, an air conditioner including an indoor unit 720 and an outdoor unit 724 is an example of an electrical appliance including a nonaqueous secondary battery 723 of one embodiment of the present invention. Specifically, the indoor unit 720 includes a housing 721, an air outlet 722, the nonaqueous secondary battery 723, and the like. Although FIG. 9 illustrates the case where the nonaqueous secondary battery 723 is provided in the indoor unit 720, the nonaqueous secondary battery 723 may be provided in the outdoor unit 724. Alternatively, the nonaqueous secondary batteries 723 may be provided in both the indoor unit 720 and the outdoor unit 724. The air conditioner can receive power from a commercial power supply. Alternatively, the air conditioner can use power stored in the nonaqueous secondary battery 723. Particularly in the case where the nonaqueous secondary batteries 723 are provided in both the indoor unit 720 and the outdoor unit 724, the air conditioner can be operated with the use of the nonaqueous secondary battery 723 of one embodiment of the present invention as an uninterruptible power supply even when power cannot be supplied from a commercial power supply due to power failure or the like.

Note that although the split-type air conditioner including the indoor unit and the outdoor unit is illustrated in FIG. 9 as an example, the nonaqueous secondary battery of one embodiment of the present invention can be used in an air conditioner in which the functions of an indoor unit and an outdoor unit are integrated in one housing.

In FIG. 9, an electric refrigerator-freezer 730 is an example of an electrical appliance including a nonaqueous secondary battery 734 of one embodiment of the present invention. Specifically, the electric refrigerator-freezer 730 includes a housing 731, a door 732 for the refrigerator, a door 733 for the freezer, the nonaqueous secondary battery 734, and the like. The nonaqueous secondary battery 734 is provided in the housing 731 in FIG. 9. The electric refrigerator-freezer 730 can receive power from a commercial power supply. Alternatively, the electric refrigerator-freezer 730 can use power stored in the nonaqueous secondary battery 734. Thus, the electric refrigerator-freezer 730 can be operated with the use of the nonaqueous secondary battery 734 of one embodiment of the present invention as an uninterruptible power supply even when power cannot be supplied from a commercial power supply due to power failure or the like.

Note that among the electrical appliances described above, a high-frequency heating apparatus such as a microwave oven and an electrical appliance such as an electric rice cooker require high power in a short time. The tripping of a breaker of a commercial power supply in use of an electrical appliance can be prevented by using the nonaqueous secondary battery of one embodiment of the present invention as an auxiliary power supply for supplying power which cannot be supplied enough by the commercial power supply.

In addition, in a time period when electrical appliances are not used, particularly when the proportion of the amount of power which is actually used to the total weight of power which can be supplied from a commercial power supply source (such a proportion referred to as a usage rate of power) is low, power can be stored in the nonaqueous secondary battery, whereby the usage rate of power can be reduced in a time period when the electrical appliances are used. For example, in the case of the electric refrigerator-freezer 730, power can be stored in the nonaqueous secondary battery 734 in night time when the temperature is low and the door 732 for the refrigerator and the door 733 for the freezer are not often opened and closed. On the other hand, in daytime when the temperature is high and the door 732 for the refrigerator and the door 733 for the freezer are frequently opened and closed, the nonaqueous secondary battery 734 is used as an auxiliary power supply; thus, the usage rate of power in daytime can be reduced.

This embodiment can be implemented combining with another embodiment as appropriate.

Embodiment 5

Next, a portable information terminal which is an example of the electrical appliance will be described with reference to FIGS. 10A to 10C.

Figure 10A:
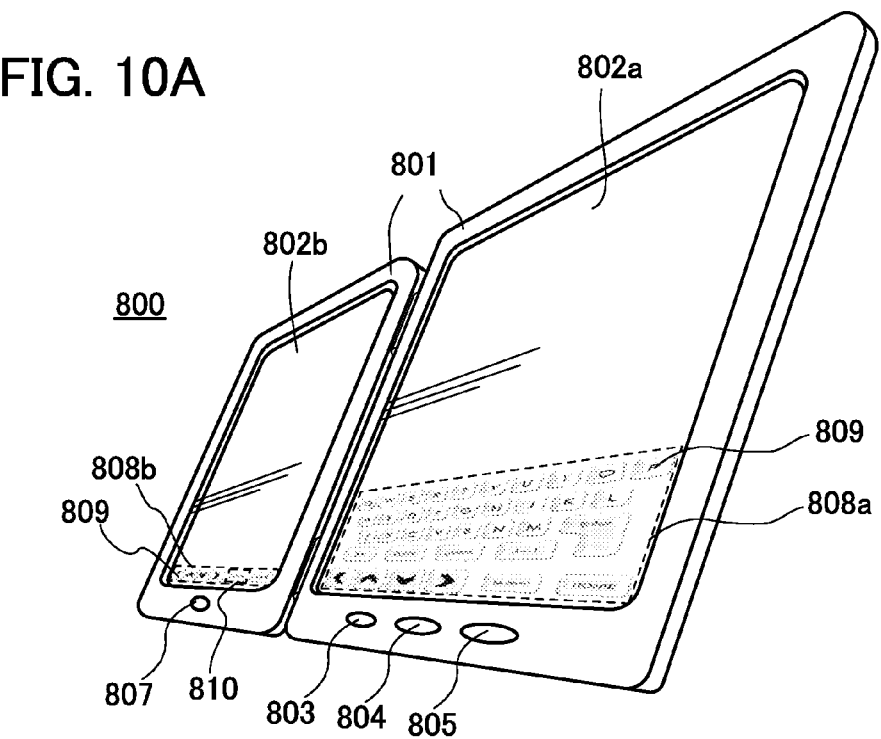
FIGS. 10A to 10C illustrate an electronic device.
Figure 10B:
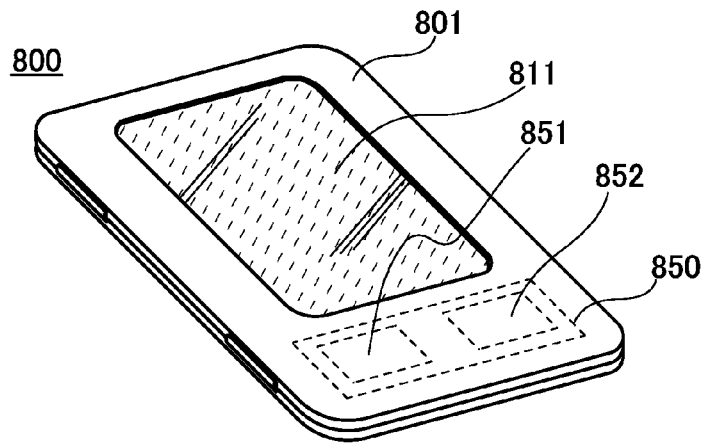

FIGS. 10A and 10B illustrate a tablet terminal 800 that can be folded. In FIG. 10A, the tablet terminal 800 is opened, and includes a housing 801, a display portion 802a, a display portion 802b, a switch 803 for switching display modes, a power switch 804, a switch 805 for switching to power-saving mode, and an operation switch 807.

Part of the display portion 802a can be a touch panel region 808a and data can be input when a displayed operation key 809 is touched. Although a structure in which a half region in the display portion 802a has only a display function and the other half region has a touch panel function is shown as an example, the display portion 802a is not limited to the structure. The whole region in the display portion 802a may have a touch panel function. For example, keyboard buttons can be displayed on the entire display portion 802a to be used as a touch panel, and the display portion 802b can be used as a display screen.

As in the display portion 802a, part of the display portion 802b can be a touch panel region 808b. A switching button 810 for showing/hiding a keyboard of the touch panel is touched with a finger, a stylus, or the like, so that keyboard buttons can be displayed on the display portion 802b.

Touch input can be performed in the touch panel region 808a and the touch panel region 808b at the same time.

The switch 803 for switching display modes can switch the display between portrait mode, landscape mode, and the like, and between monochrome display and color display, for example. The switch 805 for switching to power-saving mode can control display luminance to be optimal in accordance with the amount of external light in use of the tablet terminal which is detected by an optical sensor incorporated in the tablet terminal. Another detection device including a sensor or the like for detecting inclination, such as a gyroscope or an acceleration sensor, may be incorporated in the tablet terminal, in addition to the optical sensor.

Note that FIG. 10A illustrates an example in which the display portion 802a and the display portion 802b have the same display area; however, without limitation thereon, one of the display portions may be different from the other display portion in size and display quality. For example, one display panel may be capable of higher-definition display than the other display panel.

The tablet terminal 800 is closed in FIG. 10B. The tablet terminal includes the housing 801, a solar cell 811, a charge-discharge control circuit 850, a battery 851, and a DC-DC converter 852. In FIG. 10B, a structure including the battery 851 and the DC-DC converter 852 is illustrated as an example of the charge-discharge control circuit 850. The nonaqueous secondary battery described in any of the above embodiments is used as the battery 851.

Since the tablet terminal 800 can be folded, the housing 801 can be closed when the tablet terminal is not used. As a result, the display portion 802a and the display portion 802b can be protected; thus, the tablet terminal 800 which has excellent durability and excellent reliability also in terms of long-term use can be provided.

In addition, the tablet terminal illustrated in FIGS. 10A and 10B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 811 provided on a surface of the tablet terminal can supply power to the touch panel, the display portion, a video signal processing portion, or the like. Note that the solar cell 811 can be preferably provided on one or both surfaces of the housing 801, in which case the battery 851 can be charged efficiently. When the nonaqueous secondary battery described in any of the above embodiments is used as the battery 851, there is an advantage such as a reduction in size.

The structure and the operation of the charge-discharge control circuit 850 illustrated in FIG. 10B will be described with reference to a block diagram in FIG. 10C. The solar cell 811, the battery 851, the DC-DC converter 852, a converter 853, switches SW1 to SW3, and the display portion 802 are illustrated in FIG. 10C, and the battery 851, the DC-DC converter 852, the converter 853, and the switches SW1 to SW3 correspond to the charge-discharge control circuit 850 in FIG. 10B.

First, an example of the operation in the case where power is generated by the solar cell 811 using external light is described. The voltage of power generated by the solar cell is raised or lowered by the DC-DC converter 852 so that the power has a voltage for charging the battery 851. Then, when the power from the solar cell 811 is used for the operation of the display portion 802, the switch SW1 is turned on and the voltage of the power is raised or lowered by the converter 853 so as to be a voltage needed for the display portion 802. In addition, when display on the display portion 802 is not performed, the switch SW1 is turned off and the switch SW2 is turned on so that the battery 851 may be charged.

Note that the solar cell 811 is described as an example of a power generation means; however, without limitation thereon, the battery 851 may be charged using another power generation means such as a piezoelectric element or a thermoelectric conversion element (Peltier element). For example, the battery 851 may be charged with a non-contact power transmission module which is capable of charging by transmitting and receiving power by wireless (without contact), or another charging means may be used in combination.

Figure 10C:
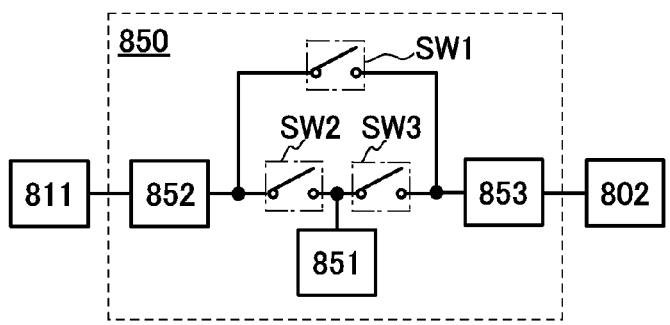

It is needless to say that one embodiment of the present invention is not limited to the electrical appliance illustrated in FIGS. 10A to 10C as long as the nonaqueous secondary battery described in any of the above embodiments is included.

Embodiment 6

Further, an example of the moving object which is an example of the electrical appliance will be described with reference to FIGS. 11A and 11B.

The nonaqueous secondary battery described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 11A:
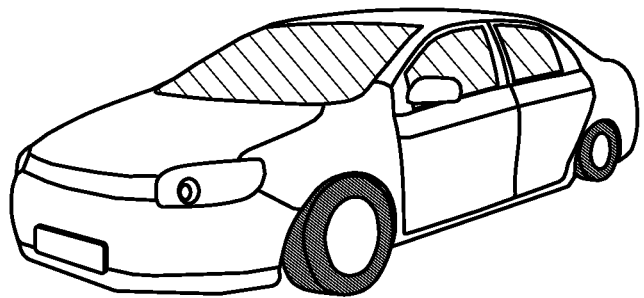
FIGS. 11A and 11B illustrate an electronic device.
Figure 11B:
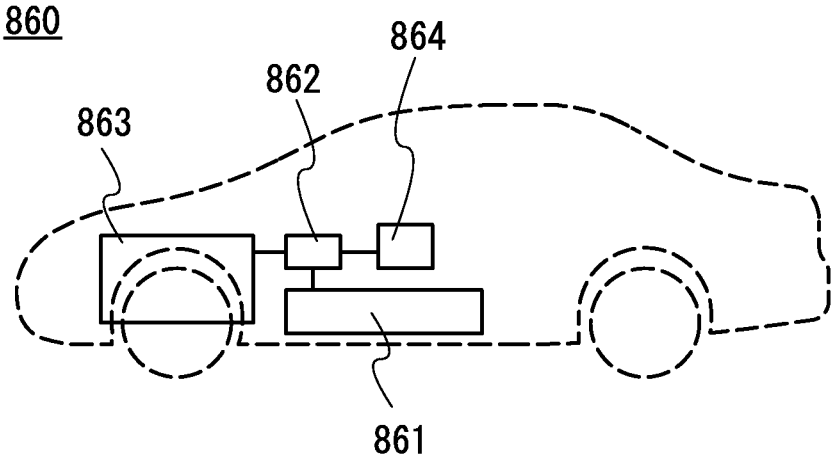

FIGS. 11A and 11B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, or the like which is not illustrated.

The driving device 863 includes a DC motor or an AC motor either alone or in combination with an internal-combustion engine. The processing unit 864 outputs a control signal to the control circuit 862 based on input data such as data of operation (e.g., acceleration, deceleration, or stop) by a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting external power into DC constant voltage having a predetermined voltage level through a converter such as an AC-DC converter. Providing the nonaqueous secondary battery of one embodiment of the present invention as the battery 861 can contribute to an increase in the capacity of the battery, so that convenience can be improved. When the battery 861 itself can be more compact and more lightweight as a result of improved characteristics of the battery 861, the vehicle can be lightweight and fuel efficiency can be increased.

It is needless to say that one embodiment of the present invention is not limited to the electronic device described above as long as the electronic device includes the nonaqueous secondary battery of one embodiment of the present invention.

This embodiment can be implemented combining with another embodiment as appropriate.

Example 1

The present invention will be specifically described below with examples. This example shows results of formation of a positive electrode by the method described in Embodiment 2. Note that the present invention is not limited to the examples described below.

Charge-discharge characteristics are compared between a cell including a positive electrode with a conductive additive using a graphene oxide (in which the atomic ratio of oxygen to carbon (also referred to as O/C, or the degree of oxidation) was set to 0.547) as a raw material and cells including positive electrodes using a graphene and a reduced graphene oxide (RGO) whose degree of oxidation is considered extremely low as conductive additives. Charge-discharge characteristics of a cell including a positive electrode using conventional acetylene black (AB) as a conductive additive is also compared.

(Fabrication of Positive Electrode Including Conductive Additive Using Graphene Oxide as Raw Material)

A positive electrode was fabricated using the graphene oxide in which the O/C was 0.547. The positive electrode was fabricated in such a way that positive electrode active material (lithium iron phosphate ($LiFePO_4$)) particles, a binding agent (polyvinylidene fluoride (PVDF) produced by Kureha Corporation), and the graphene oxide as a conductive additive were mixed to form a positive electrode paste and the positive electrode paste was applied on a current collector (aluminum) and then was dried and reduced. In the fabrication, the compounding ratio ($LiFePO_4$:conductive additive (graphene oxide):PVDF) in the positive electrode paste was set to 93:2:5 (unit: wt %).

(Fabrication of Positive Electrode Using RGO as Conductive Additive)

The reduced graphene oxide (RGO) in this specification means a graphene formed by reduction of a graphene oxide in advance and is already reduced when dispersed into a dispersion medium. Therefore functional groups such as an epoxy group are probably almost eliminated by the reduction reaction. The graphene oxide prepared by the method described in Embodiment 1 was reduced by heat treatment in which, after held in a vacuum for 1 hour, the graphene oxide was increased in temperature to 170° C. and held for 10 hours, so that the RGO was formed. The reduction probably decreases functional groups such as an epoxy group on a surface of the RGO to about 10 wt % (weight percent). This RGO was mixed into NMP, and lithium iron phosphate and PVDF were added thereto, so that the positive electrode paste was formed. The positive electrode paste applied on the current collector was heated and the dispersion medium was volatilized; consequently, the positive electrode having the positive electrode active material layer on the current collector was fabricated. The compounding ratio ($LiFePO_4$:conductive additive (RGO):PVDF) in the positive electrode active material layer was set to 94:1:5.

(Fabrication of Positive Electrodes Using Graphene as Conductive Additive)

As the graphene, a product of Graphene Supermarket was used. The graphene had a specific surface area of 600 $m^2/g$, a flake size of about 10 µm, and a thickness less than or equal to 1 nm, in which the O/C was 0.02. As in the above RGO, the number of bonded functional groups is extremely smaller in the graphene than in the graphene oxide. This graphene is heated at 170° C. for 10 hours by the same method as above to form the positive electrodes. The following two positive electrodes were fabricated: the positive electrode in which the compounding ratio in the active material layer ($LiFePO_4$:conductive additive (graphene):PVDF) was 94:1:5 and the positive electrode in which the compounding ratio in the active material layer was 90:5:5.

(Fabrication of Positive Electrode Using Acetylene Black as Conductive Additive)

As acetylene black (AB), a powdery product of Denki Kagaku Kogyo Kabushiki Kaisha was used. The specific surface area was 68 m²/g and the average particle diameter was 35 nm. The compounding ratio (LiFePO$_4$:conductive additive (AB):PVDF) in the positive electrode active material layer was set to 80:15:5.
(Measurements of Electrode Conductivities)

The conductivities of the positive electrode active material layers using the graphene oxide, the graphene included at 1%, the graphene included at 5%, and acetylene black were measured. The measurements gave results shown in the following Table 1.

TABLE 1

| Positive electrode active material layers | Thickness (μm) | Denstiy (g/cm³) | Conductivity (S/cm) |
|---|---|---|---|
| Including conductive additive using graphene oxide | 30 | 2.6 | $1.3 \times 10^{-6}$ |
| Including conductive additive using graphene included at 1% | 48 | 1.6 | Measuring limit |
| Including conductive additive using graphene included at 5% | 43 | 1.5 | $5.6 \times 10^{-3}$ |
| Including conductive additive using acetylene black (AB) | 23 | 1.4 | $1.4 \times 10^{-3}$ |

The conductivity of the positive electrode active material layer including the conductive additive using the graphene oxide was the lowest: $1.3 \times 10^{-6}$ S/cm. The conductivities of the positive electrode active material layers using the graphene and acetylene black are higher by two or more orders of magnitude.
(Charge-Discharge Characteristics)

The above-described positive electrodes using the graphene formed by reduction performed after the paste including the graphene oxide was applied on the current collector, the RGO, the graphene, and acetylene black (AB) as conductive additives were included in half cells, and charge-discharge characteristics of the cells were measured. Here, for convenience, the cell using the graphene oxide in accordance with the present invention as a raw material of the conductive additive is referred to as a cell D, the cell using the RGO is referred to as a cell E, the cell using the graphene included at 1% is referred to as a cell F, the cell using the graphene included at 5% is referred to as a cell G, and the cell using AB is referred to as a cell H. In the measurements, the charge rate was set to 0.2 C (0.16 C for the cell of the positive electrode using AB (cell H)) and the discharge rate was set to 1 C (0.82 C for the cell H).

As a result of the measurements, the cell E using the RGO as the conductive additive and the cell F using the graphene included at 1% as the conductive additive were not able to be charged or discharged at all.

In contrast, battery properties of the cell G using the graphene included at 5% as the conductive additive and the cell H using conventional acetylene black as the conductive additive were confirmed. Charge-discharge characteristics of the cells G and H in addition to those of the cell D using the graphene oxide in accordance with the present invention as a raw material of the conductive additive are shown in FIG. 12.

Figure 12:
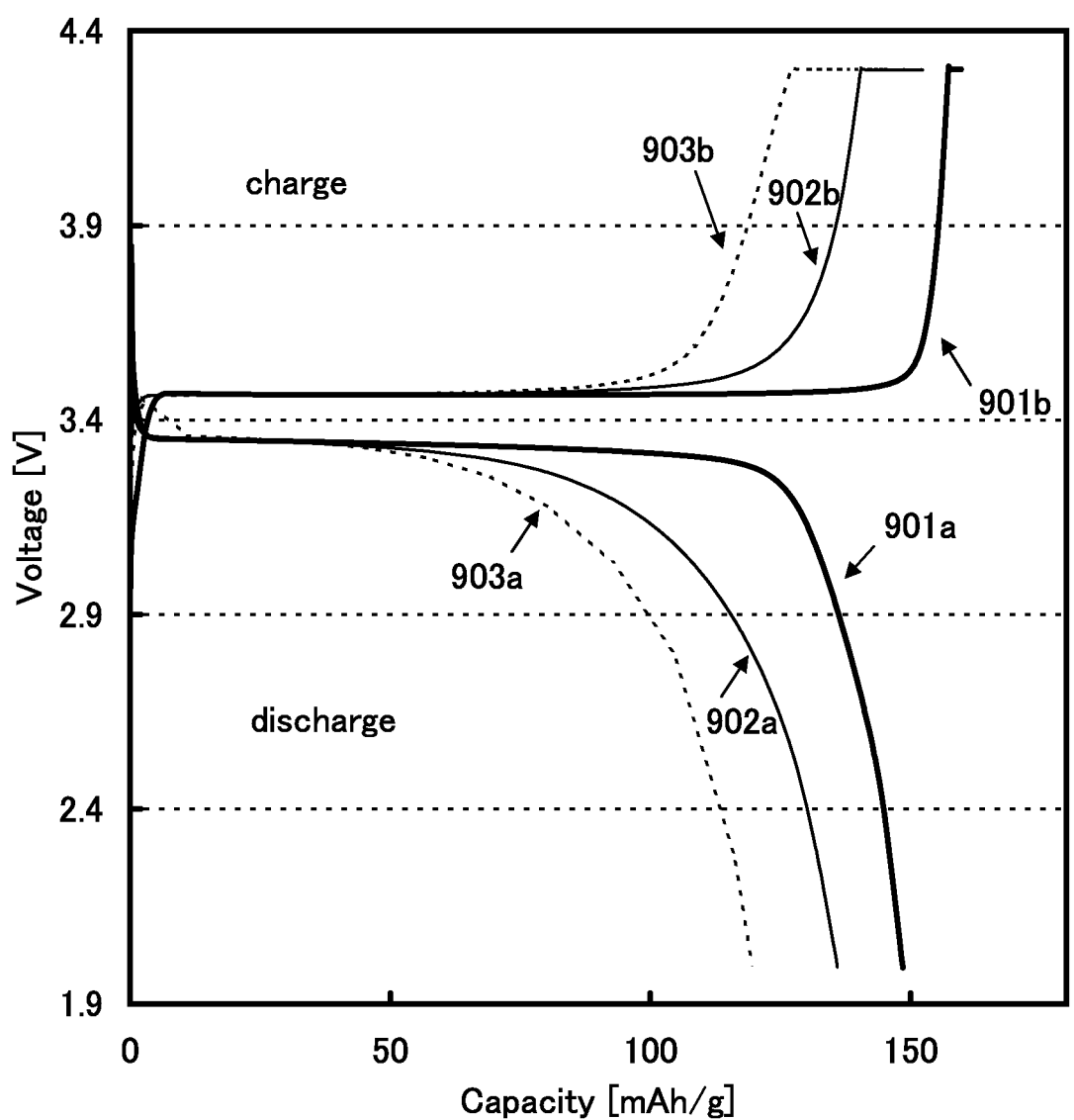
FIG. 12 shows comparison between charge-discharge characteristics.

FIG. 12 shows charge-discharge characteristics, in which the horizontal axis represents discharge capacity (mAh/g) and the vertical axis represents voltage (V). The heavy line is a curve showing charge-discharge characteristics of the cell D using the graphene oxide as a raw material of the conductive additive. The thin line is a curve showing charge-discharge characteristics of the cell G using the graphene included at 5% as the conductive additive. The dashed line is a curve showing charge-discharge characteristics of the cell H using acetylene black as the conductive additive.

A discharge curve 901a and a charge curve 901b show that the cell D exhibited good charge-discharge characteristics.

In contrast, the cell G using the graphene as the conductive additive was found to have low discharge capacity, showing narrow charge-discharge regions that were plateaus in a discharge curve 902a and a charge curve 902b.

Further, the cell H using acetylene black as the conductive additive was found to have low discharge capacity, showing no discharge regions that were plateaus in a discharge curve 903a and a charge curve 903b.

As described above, the cells did not have good charge-discharge characteristics with the positive electrodes using the RGO and the graphene which had almost no functional group as the conductive additive. In contrast, the cell had good charge-discharge characteristics with the positive electrode formed in such a way that the graphene oxide having functional groups bonded by oxidation reaction was dispersed in the dispersion medium. This may mean that, in the positive electrode active material layer including the graphene formed by reduction performed after the graphene oxide is dispersed in the positive electrode paste, the graphene forms a network with high electron conductivity. On the other hand, in the positive electrode active material layer formed by dispersion of the RGO or the graphene having almost no functional group in the positive electrode paste, a network for electron conductivity is probably not sufficiently formed. Thus, the use of the graphene oxide having a functional group as a raw material of the conductive additive is important in achieving high electron conductivity of the positive electrode active material layer.

Example 2

Next, experiments were conducted to examine the effect of difference in the degree of oxidation of the graphene oxide (the number of functional groups having oxygen such as an epoxy group) on the charge-discharge characteristics of a secondary battery.
(Fabrication of Positive Electrodes)

First, to examine the effect of difference in the degree of oxidation of the graphene oxide used on charge-discharge characteristics of a secondary battery, three positive electrodes, a sample A, a sample B, and a sample C, using graphene oxides with different degrees of oxidation were prepared.

In this example, since graphene oxides with different degrees of oxidation were necessary to examine the effect of difference in the degree of oxidation of the graphene oxide on charge-discharge characteristics of a secondary battery, graphenes having almost no functional group were used as a raw material without use of the graphite powder described in Embodiment 1. Such graphenes can be oxidized to from graphene oxides with oxidizers whose weights are made different while the weights of the graphenes are uniform. Thus, graphene oxides with different degrees of oxidation can be fabricated.

For the sample A, the sample B, and the sample C, graphenes produced by Cheap Tubes, Inc. were used. The graphenes each had a thickness of 3 nm on average. In the sample A, the sample B, and the sample C, the weights of the graphenes were each set to 0.25 g. The graphenes were oxidized by being mixed into 46 ml of sulfuric acid to which 1.5 g of potassium permanganate (KMnO$_4$), 0.5 g of the same oxidizer, and 0.2 g of the same oxidizer were added as an oxidizer for the sample A, the sample B, and sample C, respectively. The oxidation treatment was performed by stirring at room temperature for 2.5 hours. After that, pure water was added to the mixture, the mixture was stirred for 15 minutes while being heated, and a hydrogen peroxide solution was added thereto, so that a yellow-brown suspension including a graphite oxide was obtained.

The degrees of oxidation of the prepared graphene oxides for the samples A to C were measured by X-ray photoelectron spectroscopy (XPS). In the measurements, monochromatic light A1 (1486.6 eV) was used as an X-ray source, the measurement area was set to 100 μm diameter, and the extraction angle was set to 45°. The measurement results were shown in Table 2 and Table 3.

TABLE 2

| Sample | C | O | N | S | O/C |
|---|---|---|---|---|---|
| Sample A | 66.7 | 32.5 | — | 0.8 | 0.487 |
| Sample B | 70.7 | 28.6 | — | 0.7 | 0.405 |
| Sample C | 75.3 | 23.4 | 0.8 | 0.4 | 0.311 | unit: atomic %

TABLE 3

| Sample | C=C | C—C, C—H | C—O | C=O | O=C—O |
|---|---|---|---|---|---|
| Sample A | 0.0 | 25.0 | 32.0 | 7.1 | 2.7 |
| Sample B | 0.0 | 30.4 | 33.1 | 4.7 | 2.5 |
| Sample C | 0.0 | 40.6 | 27.5 | 4.0 | 3.2 | unit: atomic %

Table 2 shows the quantification values (unit: atomic %) of the elements C, O, N, and S in the samples A to C and the atomic ratio of oxygen to carbon (also referred to as O/C, or the degree of oxidation). In the graphene oxide using 1.5 g of the oxidizer for the sample A, the atomic ratio of oxygen is higher than those in the other samples and the O/C is 0.487. In the graphene oxide using 0.5 g of the oxidizer for the sample B, the O/C is 0.405 and in the graphene oxide using 0.2 g of the sample C, the O/C is 0.311. Thus, by adjustment of the weights of the oxidizers used for oxidation of the graphenes, the graphene oxides with different degrees of oxidation were able to be prepared.

Table 3 shows bonding states on surfaces in the graphene oxides of the above sample A to C listed by state. As the O/C is higher, the proportions of C—C, C—H, and O=C—O are lower while the proportion of C—O is higher.

Next, using the graphene oxides prepared under the above conditions, the positive electrodes of the samples A to C were formed. The positive electrodes were each formed in such a way that positive electrode active material (lithium iron phosphate ($LiFePO_4$)) particles, a binding agent (polyvinylidene fluoride (PVDF) produced by Kureha Corporation), and one of the graphene oxides, which were prepared under the above conditions, as a conductive additive were mixed to form a positive electrode paste and the positive electrode paste was applied on a current collector (aluminum) and then was dried and reduced.

A method of forming lithium iron phosphate used as each of the active materials of the samples A to C is described. Lithium carbonate ($Li_2CO_3$), iron oxalate ($FeC_2O_4.2H_2O$), and ammonium dihydrogen phosphate ($NH_4H_2PO_4$), which were raw materials, were weighed out such that the weight ratio therebetween was 1:2:2, and were ground and mixed with a wet ball mill (the ball diameter was 3 mm and acetone was used as a solvent) at 300 rpm for 2 hours. After drying, pre-baking was performed at 350° C. for 10 hours under a nitrogen atmosphere.

Next, grinding and mixing were performed with a wet ball mill (the ball diameter was 3 mm) at 300 rpm for 2 hours. Then, baking was performed at 600° C. for 10 hours under a nitrogen atmosphere.

Next, NMP (produced by Tokyo Chemical Industry Co., Ltd.), which is a polar solvent, was prepared as a dispersion medium. After the graphene oxide was dispersed into NMP, lithium iron phosphate was added and the mixture was kneaded. After PVDF was added to the mixture of the graphene oxide and lithium iron phosphate as the binding agent, NMP was further added as the dispersion medium and mixed, whereby the positive electrode paste was formed.

The positive electrode paste formed by the above-described method was applied on a 20-μm-thick aluminum foil which is to form the current collector, dried in an air atmosphere at 80° C. for 40 minutes, and then dried under a reduced-pressure atmosphere at 170° C. for 10 hours; thus the graphene oxide in the positive electrode paste was reduced to form the graphene. The compounding ratio in the positive electrode paste was set such that the ratio of lithium iron phosphate to the graphene oxide and PVDF was 93:2:5. This compounding ratio was changed by reduction treatment of the graphene oxide such that the ratio of lithium iron phosphate to the graphene and PVDF was substantially 94:1:5 when the positive electrode active material layer was formed. However, such a small change in compounding ratio hardly affects estimation of the discharge capacity of the secondary battery. Note that, in each of the samples A to C, anchor coating was performed on a surface of the current collector in order to eliminate the influence of interfacial resistance between the current collector and the positive electrode active material layer.

As described above, the positive electrodes using the three graphene oxides that differed in the degree of oxidation as raw materials of the conductive additives were fabricated as the samples A to C.

(Charge-Discharge Characteristics)

The positive electrodes of the samples A to C which were fabricated as above were included in half cells, and charge-discharge characteristics of the cells (referred to as a cell A, a cell B, and a cell C) were measured. When the characteristics were estimated, each cell was in the form of a coin-type cell of a CR2032 type (20 mm in diameter and 3.2 mm high). Lithium foil was used as a negative electrode and a 25-μm-thick polypropylene (PP) film was used as a separator. An electrolyte solution to be used was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1. In charging, CCCV at 0.2 C was employed and the upper limit voltage was set to 4.3 V. In discharging, CC at all the rates, 0.2 C, 1 C, 2 C, 5 C, and 10 C, was employed and the lower limit voltage was set to 2 V.

Figure 13A:
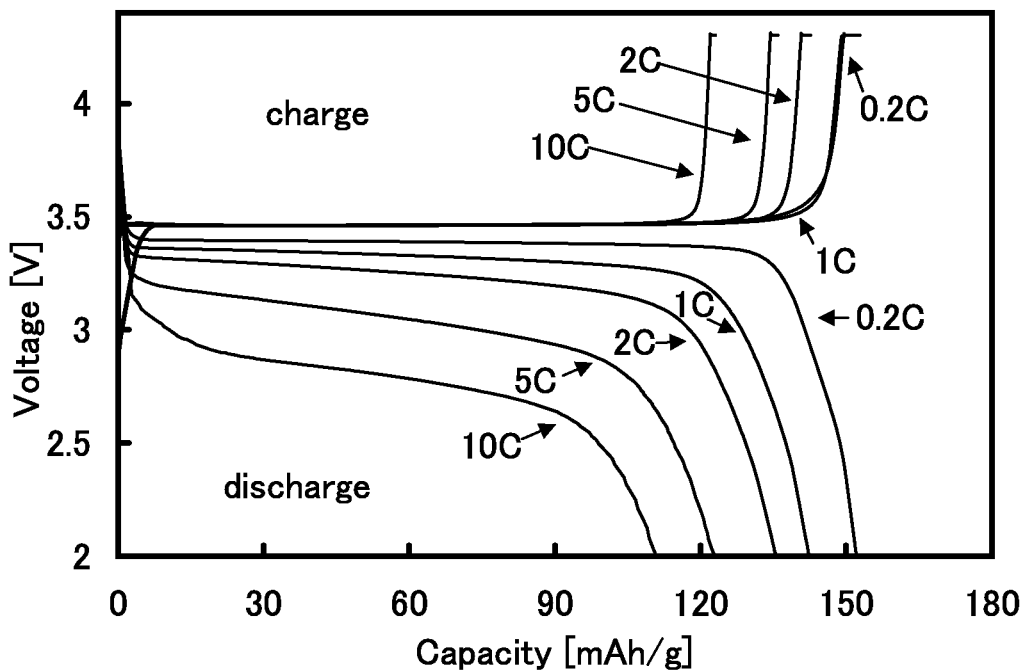
FIGS. 13A and 13B show charge-discharge characteristics of a cell A and a cell B.
Figure 13B:
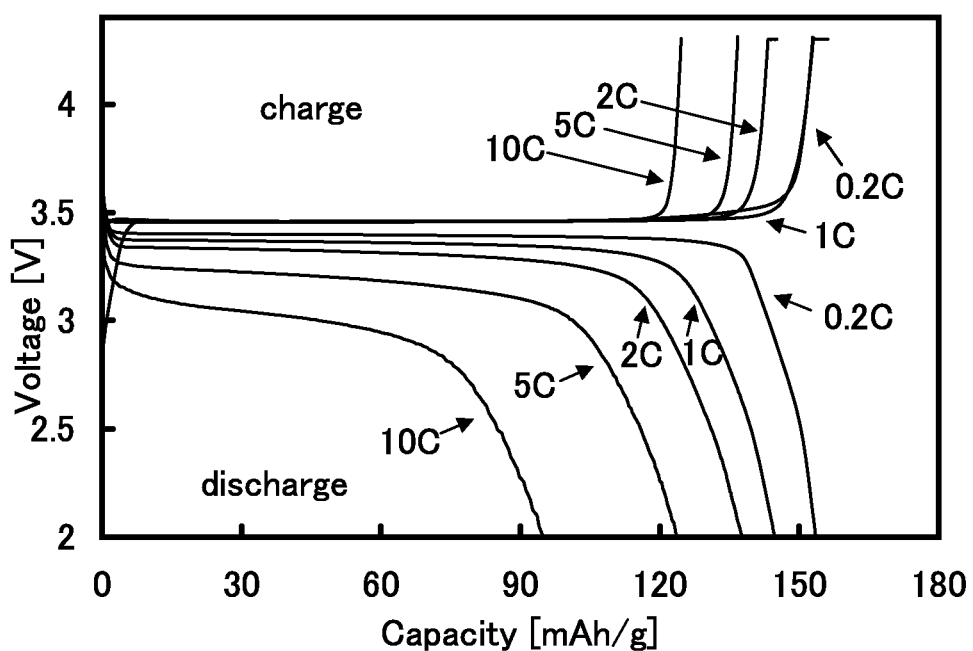

Measurement results of the charge-discharge characteristics of the cells A and B are shown in FIGS. 13A and 13B. FIG. 13A shows the measurement results of the charge-discharge characteristics of the cell A including the positive electrode of the sample A using the graphene formed with the graphene oxide in which the O/C is 0.487 as a raw material. FIG. 13B shows the measurement results of the charge-discharge characteristics of the cell B including the positive electrode of the sample B using the graphene formed with the graphene oxide in which the O/C is 0.405 as a raw material. In each figure, the horizontal axis represents discharge capacity per active material weight (unit: mAh/g) and the vertical axis represents voltage (unit: volt).

As shown in FIG. 13A, the cell A exhibits good battery properties.

As shown in FIG. 13B, the cell B also exhibits good battery properties.

In contrast, the cell C using the positive electrode of the sample C including the graphene formed using the graphene oxide in which the O/C was 0.311 did not operate as a battery at all.

As described above, the cells A and B each including the positive electrode including the conductive additive using the graphene oxide in which the O/C, i.e., the degree of oxidation, was greater than or equal to 0.405 as a raw material were able to exhibit sufficient charge-discharge characteristics. In contrast, the cell C including the positive electrode including the conductive additive using the graphene oxide in which the O/C was 0.311 as a raw material was not able to exhibit battery properties. Thus, in the case where the graphene oxide in which the O/C was at least greater than or equal to 0.405 is used, functional groups having oxygen bonded to the graphene oxide are sufficiently included, and accordingly the graphene oxide in the dispersion medium is uniformly dispersed. For this reason, the graphenes formed by the reduction treatment of the graphene oxide performed by heating the positive electrode paste are mixed with high dispersibility in the positive electrode active material and in surface contact with each other; consequently, the graphenes form a network with high electron conductivity, thereby providing battery properties.

In contrast, in the case where the positive electrode including the conductive additive using the graphene oxide in which the O/C is less than or equal to 0.311 as a raw material is used, the dispersibility of the graphene oxide in the positive electrode paste is low. Therefore the graphene formed by reduction was not sufficiently dispersed in the positive electrode active material or was aggregated, which failed to form a sufficient network for electron conduction. This was probably why battery properties were not able to be obtained.

Example 3

To visually confirm that the use of a graphene oxide having functional groups increases the dispersibility in the positive electrode active material, scanning electron microscope (SEM) observation was performed on the positive electrode active material layer formed using the graphene oxide as a raw material of the conductive additive. For comparison, a positive electrode active material layer using a RGO as a conductive additive and a positive electrode active material layer using a graphene as a conductive additive were also subjected to SEM observation.

Figure 14A:
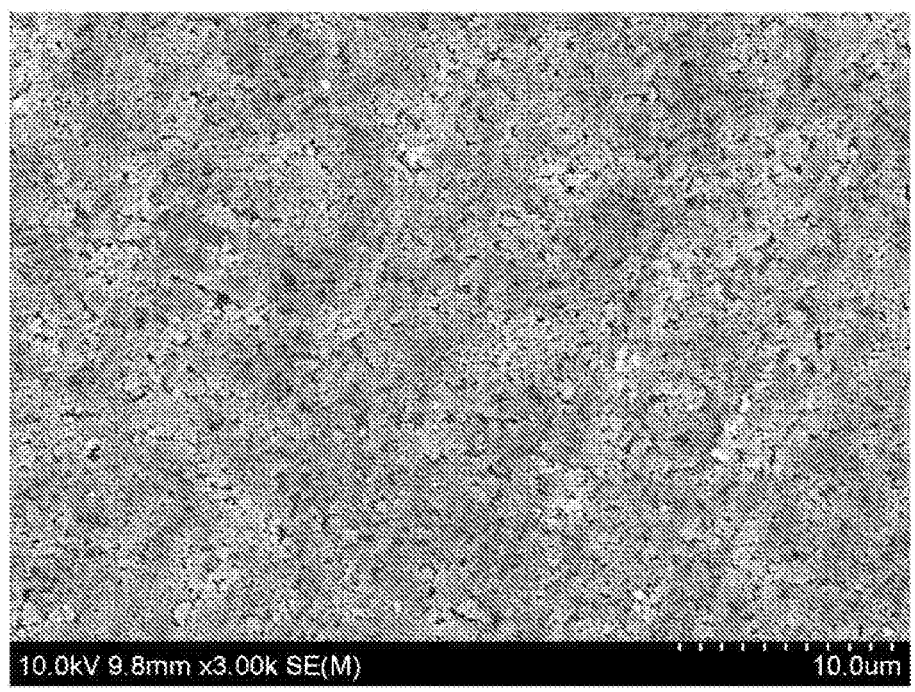
FIGS. 14A and 14B are SEM images of a positive electrode active material layer using a graphene oxide as a raw material of a conductive additive.
Figure 14B:
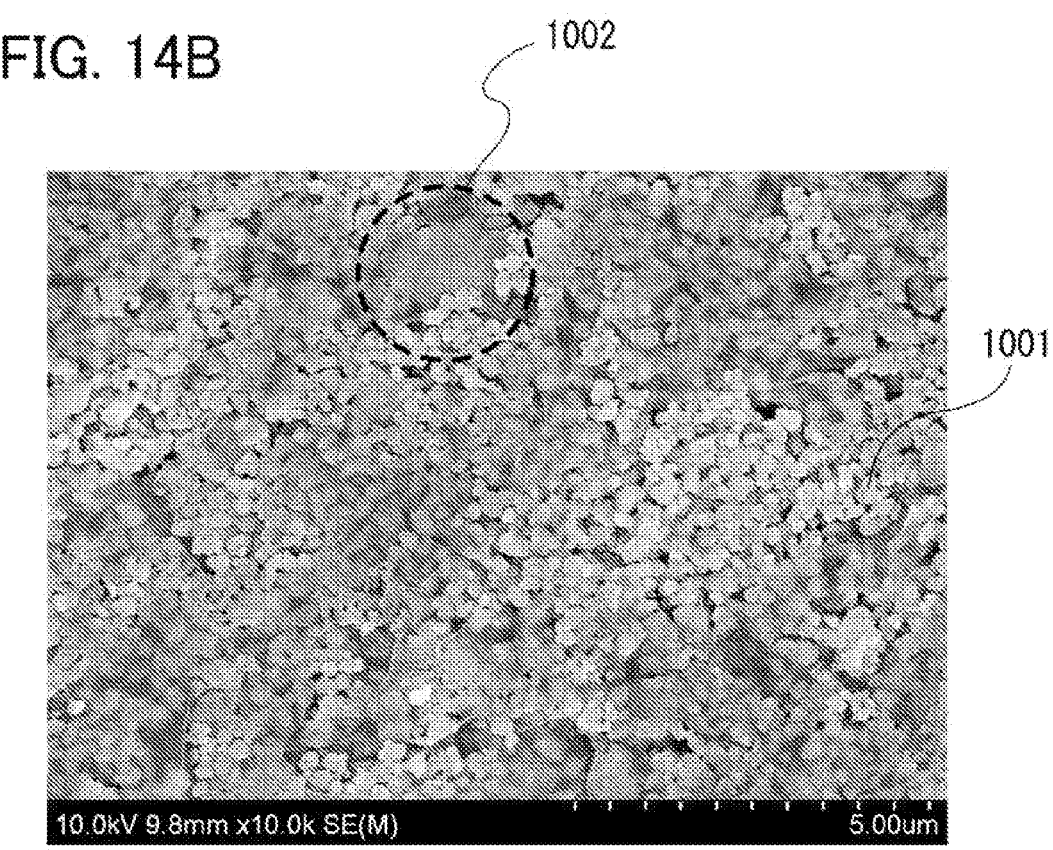
Figure 15:
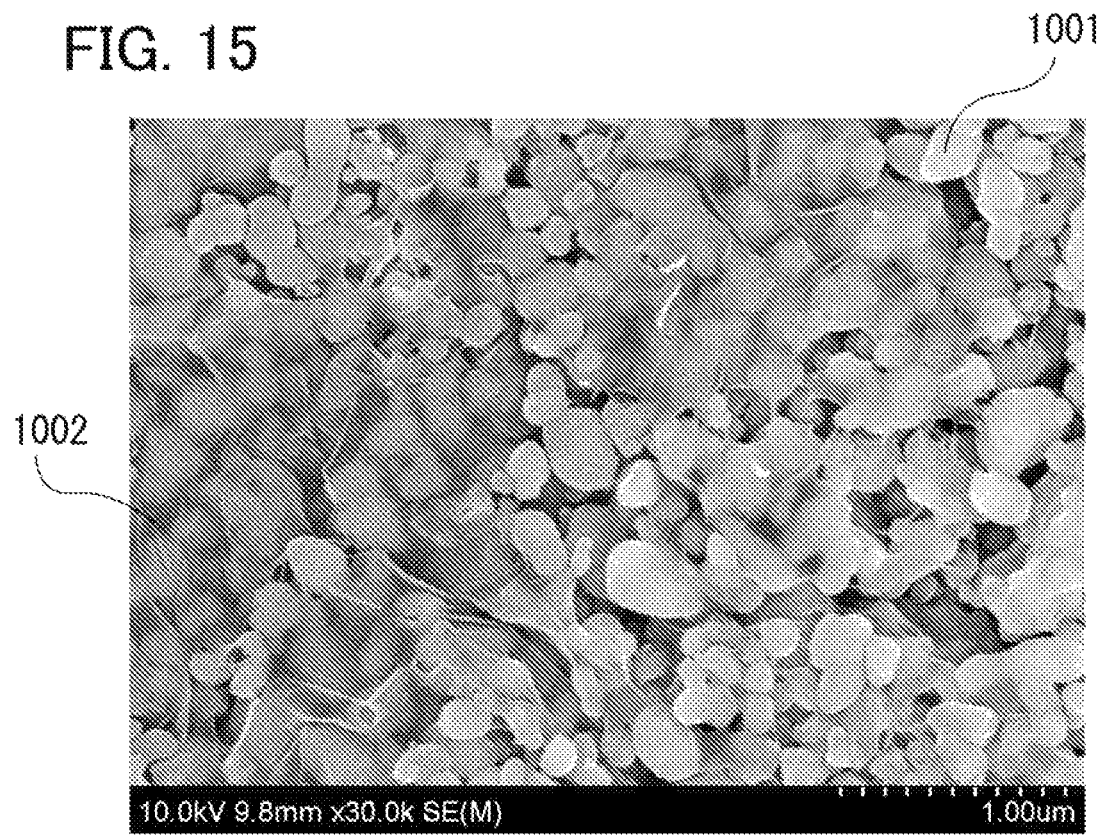
FIG. 15 is a SEM image of a positive electrode active material layer using a graphene oxide as a raw material of a conductive additive.

FIG. 14A shows a SEM image of a surface of the positive electrode active material layer formed using the graphene oxide as a raw material of a conductive additive. In the image, the reduced graphene is present not only in a deep-color portion but also over the entire region. The graphene is observed to adhere in a patchy pattern. FIG. 14B is a magnified image of part of FIG. 14A. The plurality of positive electrode active material particles 1001 is observed. The positive electrode active material particles 1001 are aggregated in batches of several or several tens of pieces. Further, in FIG. 14B, as indicated in the dashed-line circle, for example, the deep-color portion represents a graphene 1002. FIG. 15 is a magnified SEM image of part of FIG. 14B. The image reveals that the graphenes 1002 spread in such a way as to coat a plurality of positive electrode active material particles 1001 which is aggregated. Since the graphene 1002 is thin, it makes surface contact with the positive electrode active material particles in such a way as to wrap them along surfaces of the positive electrode active material particles. Part of the graphenes 1002 which is not in contact with the positive electrode active material particles 1001 is stretched, warped, or crimped. In addition, the graphene 1002 is present not only on a surface of the active material layer but also inside the active material layer.

FIGS. 16A and 16B, FIGS. 20A and 20B, FIG. 21, and FIG. 22 are SEM images showing cross sections of the positive electrode active material layers formed using the graphene oxide as a raw material of a conductive additive.

Figure 16A:
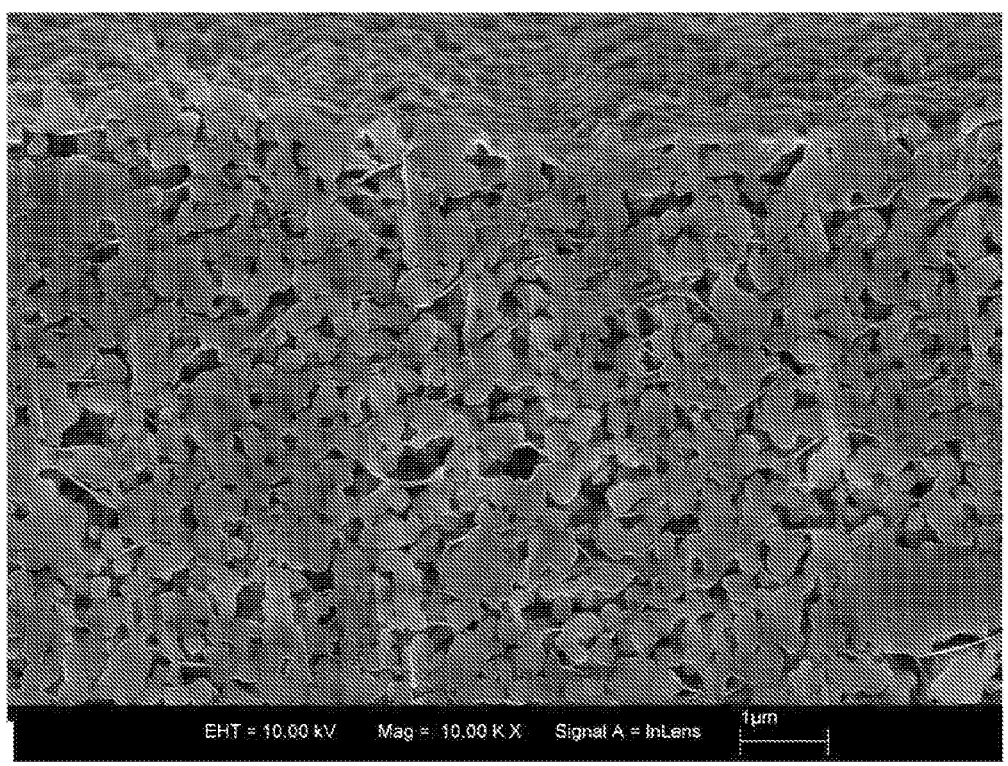
FIGS. 16A and 16B are SEM images of a positive electrode active material layer using a graphene oxide as a raw material of a conductive additive.
Figure 16B:
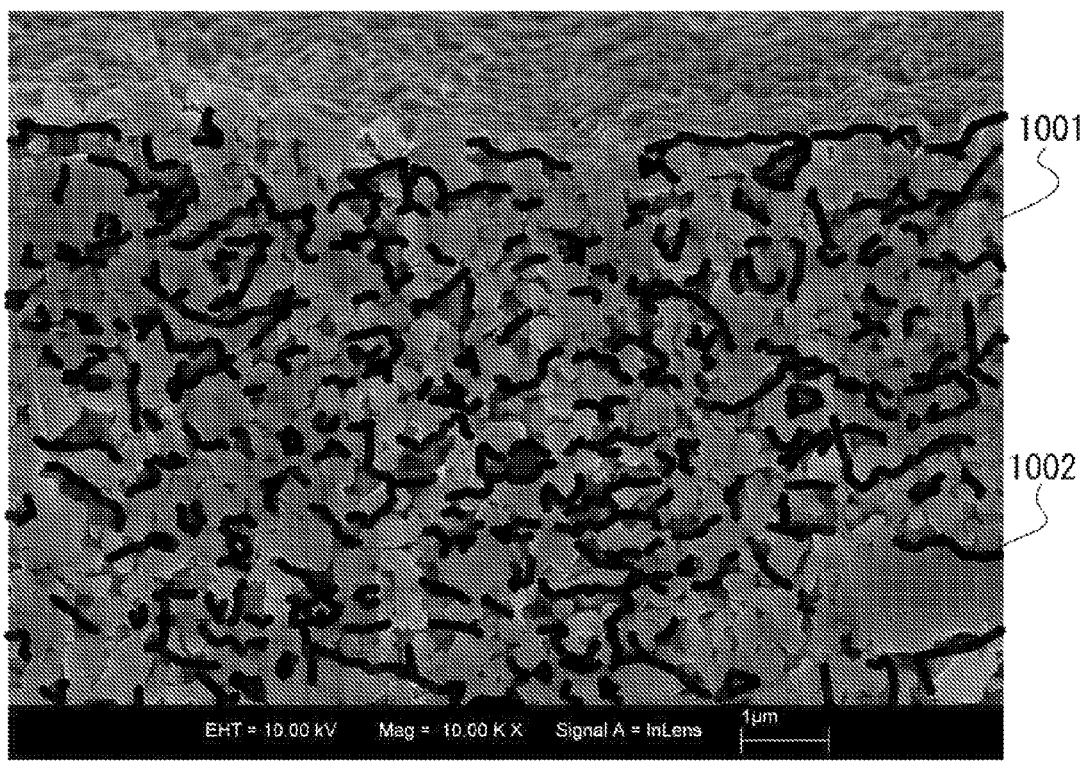
Figure 21:
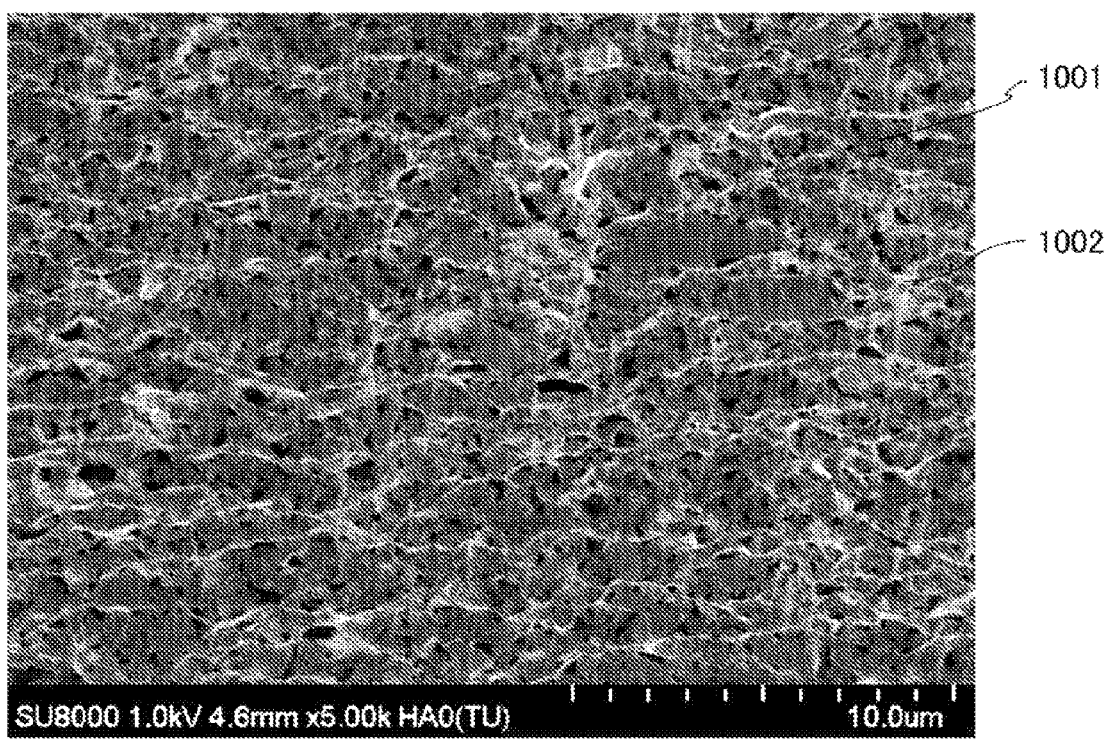
FIG. 21 is a SEM image of a positive electrode active material layer using a graphene oxide as a raw material of a conductive additive.

FIGS. 16A and 16B and FIG. 21 show positive electrode material layers fabricated so that the ratio of lithium iron phosphate (LiFePO$_4$) to the conductive additive (graphene oxide) and PVDF was 93:2:5 (unit:wt %). In the positive electrode material layer shown in FIGS. 16A and 16B, PVDF (1100) produced by Kureha Corporation was used. In the positive electrode material layer in FIG. 21, PVDF (9100) produced by Kureha Corporation was used. In addition, FIG. 21 is a voltage contrast image which clearly shows the graphene oxide.

In the SEM images in FIG. 16A and FIG. 21, the plurality of positive electrode active material particles is seen. In part of the images, aggregated positive electrode active material particles can also be seen. Here, white thread- or string-like portions correspond to graphenes. Note that among the graphenes, a multilayer graphene including fewer layers may fail to be observed in the SEM images. Further, even graphenes observed far away from each other may be connected through a multilayer graphenes including fewer layers which fails to be observed by SEM. The graphenes can be seen like a thread or a string in a gap (void) between the plurality of positive electrode active material particles and also adheres to the surfaces of the positive electrode active material particles. In FIG. 16B, some of the graphenes in the SEM image in FIG. 16A are highlighted by heavy lines. In both FIG. 16B and FIG. 21, the graphenes 1002 are found to be three-dimensionally dispersed in the positive electrode active material particles in such a way as to wrap the positive electrode active material particles 1001. The graphenes 1002 make surface contact with the plurality of positive electrode active material particles 1001 while being in surface contact with each other. Thus, in the positive electrode active material layer, the graphenes are connected to each other and forms a network for electron conduction.

Figure 20A:
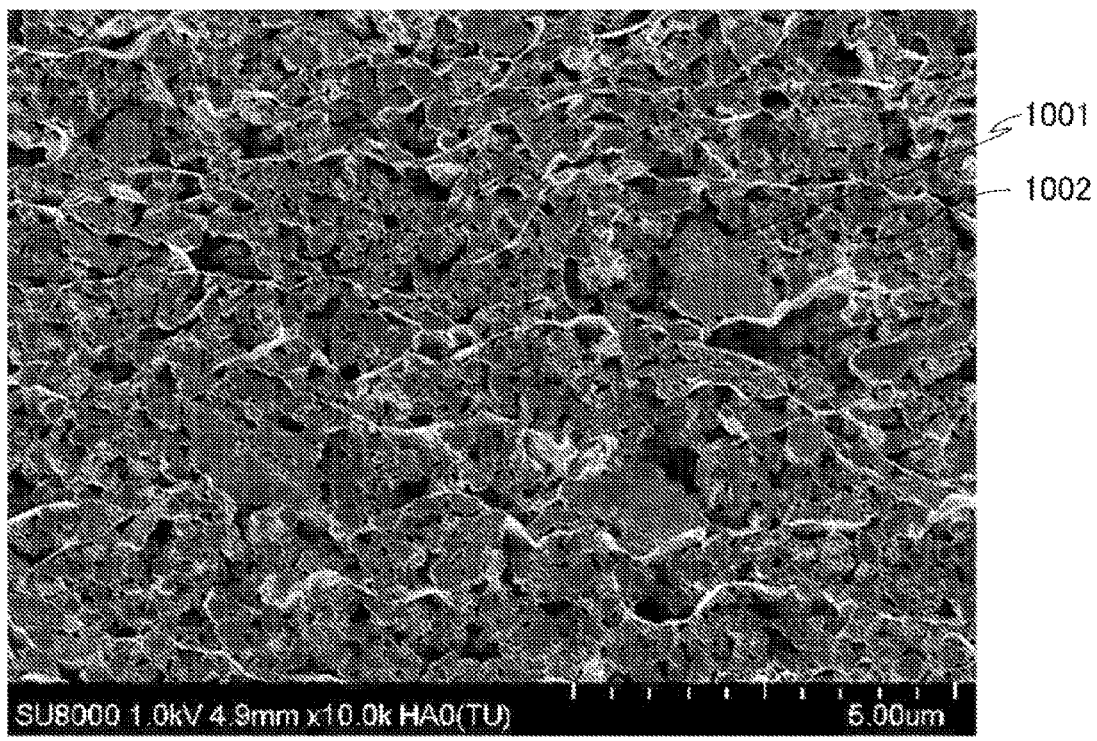
FIGS. 20A and 20B are SEM images of a positive electrode active material layer using a graphene oxide as a raw material of a conductive additive.
Figure 20B:
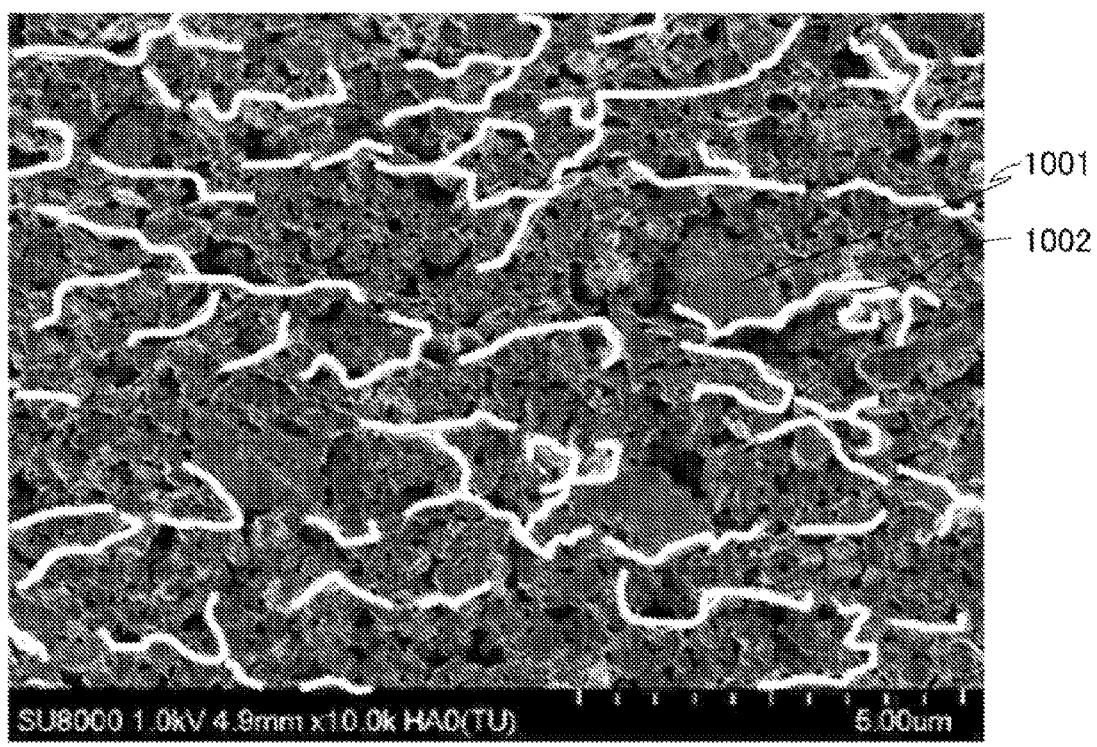

FIGS. 20A and 20B show a positive electrode material layer fabricated so that the ratio of lithium iron phosphate to the graphene oxide and PVDF was 94:1:5 (unit: wt %). In the SEM images in FIGS. 20A and 20B, the plurality of positive electrode active material particles is seen. In part of the images, aggregated positive electrode active material particles can also be seen. As in FIGS. 16A and 16B and FIG. 21, the graphenes can be seen like a thread or a string in a gap (void) between the plurality of positive electrode active material particles and also adheres to the surfaces of the positive electrode active material particles. In FIG. 20B, some of the graphenes in the SEM image in FIG. 20A are highlighted by heavy lines. Also in FIGS. 20A and 20B, the graphenes 1002 are found to be three-dimensionally dispersed in the positive electrode active material particles in such a way as to wrap the positive electrode active material particles 1001.

Figure 22:
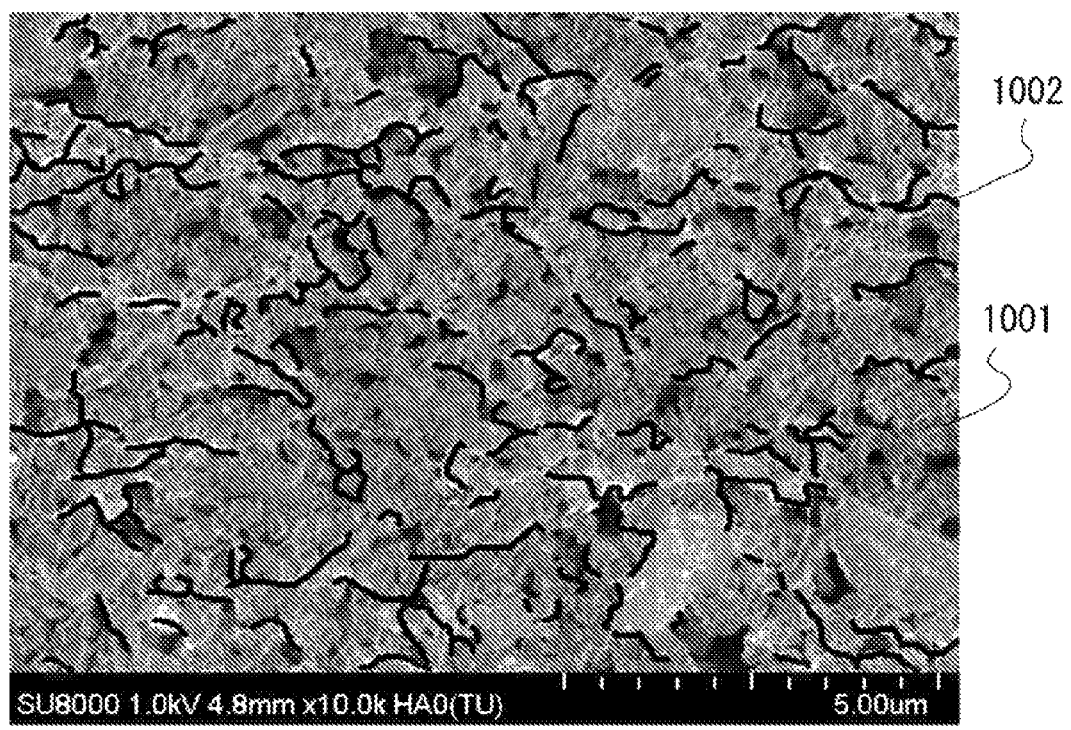
FIG. 22 is a SEM image of a positive electrode active material layer using a graphene oxide as a raw material of a conductive additive.

FIG. 22 shows a positive electrode material layer fabricated so that the ratio of lithium iron phosphate to the graphene oxide and PVDF was 94.4:0.6:5 (unit:wt %). In FIG. 22, some of the graphenes in the SEM image are highlighted by heavy lines. As in FIGS. 16A and 16B, FIGS. 20A and 20B, and FIG. 21, the graphenes 1002 are found to be three-dimensionally dispersed in the positive electrode active material particles in such a way as to wrap the positive electrode active material particles 1001. Further, the graphenes 1002 make surface contact with the positive electrode active material particles 1001 while being in surface contact with each other. Even when the graphene oxide is included at 0.6 wt %, in the positive electrode material layer, the graphenes are connected to each other and form a network for electron conduction.

Thus, regardless of the kind of PVDF or the proportion of the graphene oxide, the graphene oxide in the positive electrode material layer are similarly dispersed three-dimensionally so that a network for electron conduction can be formed.

Figure 17A:
FIGS. 17A and 17B are SEM images of a positive electrode active material layer using a RGO as a raw material of a conductive additive.
Figure 17B:
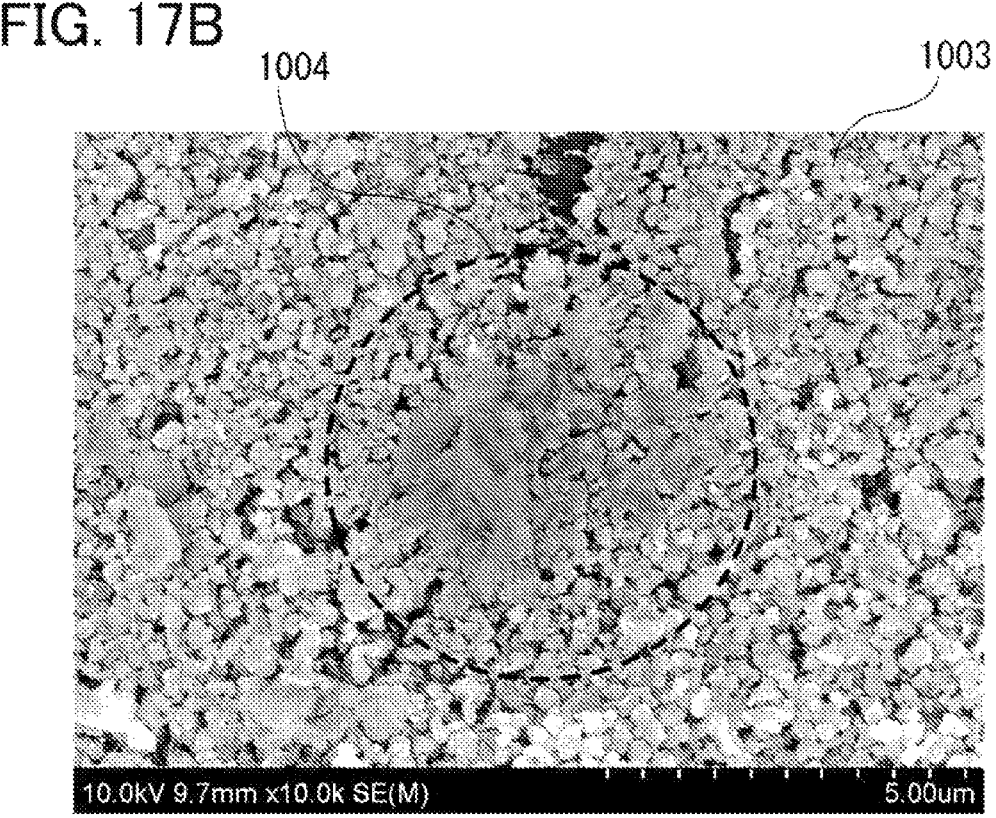

FIGS. 17A and 17B show SEM observation results of the surface of the positive electrode active material layer using the RGO as a conductive additive. In FIG. 17A, the RGO is present at the deep-color portion which is slightly below the center of the figure. FIG. 17B shows a magnified SEM image of this RGO. Although the positive electrode active material particles 1003 and the RGO 1004 are in contact with each other, the RGO is seen only around the center of the image and cannot be found to be in the other region in FIG. 17B. In other words, the RGO has low dispersibility and is aggregated on the surface of the positive electrode active material layer.

Figure 18A:
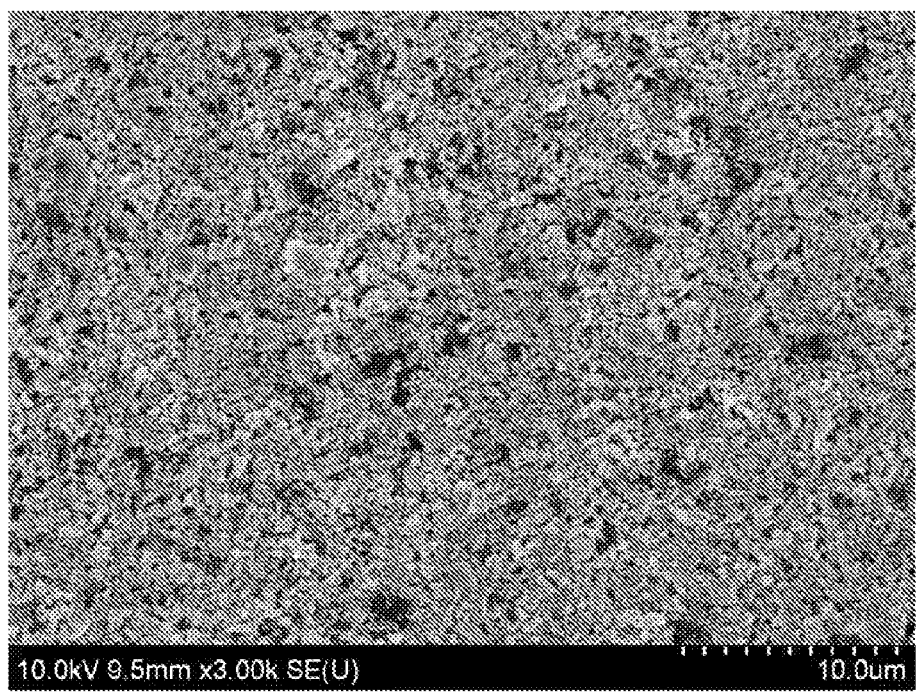
FIGS. 18A and 18B are SEM images of a positive electrode active material layer using a graphene as a raw material of a conductive additive.
Figure 18B:
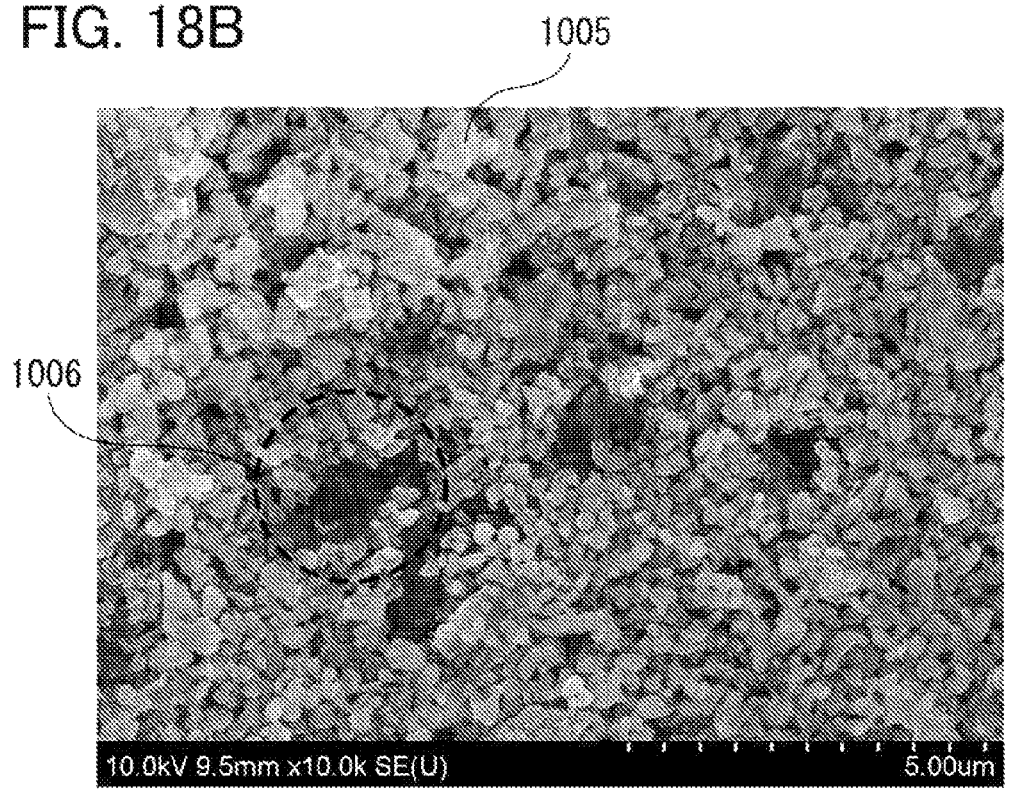

FIGS. 18A and 18B show SEM observation results of the surface of the positive electrode active material layer using the graphene as a conductive additive. In FIG. 18A, several deep-color points correspond to the graphenes. FIG. 18B is a magnified image of part of FIG. 18A. Several graphenes 1006 are scattered throughout a plurality of positive electrode active material particles 1005. Like the RGO, the graphenes have low dispersibility and are aggregated.

The above-described results reveal that, when the graphene oxide is used as a raw material of a conductive additive, dispersibility in a polar solvent is high because of the functional groups of the graphene oxide, which enables the graphene formed by reduction to be highly dispersed in the positive electrode active material layer. This demonstrates that the graphene can form a network for electron conduction in the positive electrode active material layer, whereby a positive electrode with high electron conductivity can be formed.

Example 4

Next, XPS analysis was performed to check the compositions of positive electrode active material layers of fabricated positive electrodes in accordance with the present invention, each of which includes the graphene formed by reduction performed after a paste including the graphene oxide was applied on a current collector.

The analysis was conducted for four positive electrodes (a positive electrode GN1, a positive electrode GN2, a positive electrode GN3, and a positive electrode GN4) formed by subjecting the positive electrode pastes, in which the compounding ratio of lithium iron phosphate to the graphene oxide and PVDF was 93:2:5, to treatments under the four different conditions described below.

(Positive Electrode GN1)

The positive electrode GN1 is an electrode formed by performing no reduction treatment on the graphene oxide and washed after being immersed in an electrolyte solution. The electrolyte solution used for the immersion was formed in such a way that lithium hexafluorophosphate (LiPF$_6$) was dissolved at a concentration of 1 mol/L in a solution in which ethylene carbonate (EC) and diethyl carbonate (DEC) were mixed at a volume ratio of 1:1. The washing for removing a lithium salt was performed with DEC. Note that, in the formation of the positive electrode GN1, drying for volatilizing the dispersion medium was performed but it was treatment at 80° C. for 40 minutes in an air atmosphere and these are not conditions that allow the graphene oxide to be reduced.

(Positive Electrode GN2)

The positive electrode GN2 is an electrode formed by subjecting the graphene oxide to electrochemical reduction treatment and washed with DEC like the positive electrode GN1. For the electrochemical reduction treatment, a coin cell using lithium as a counter electrode was prepared. The graphene oxide was reduced as follows: discharging was performed at 1 C until the reduction potential reached 2.0 V (vs. Li/Li$^+$) and the potential was held at 2.0 V for 10 hours.

(Positive Electrode GN3)

For the positive electrode GN3, after the same electrochemical reduction as that performed on the positive electrode GN2 was performed, charging was performed at a current of 0.2 C until the potential reached 4.3 V and the potential was held at 4.3 V until the current value became 0.01 C. In addition, the positive electrode GN3 was extracted from the cell and washed with DEC after being charged.

(Positive Electrode GN4)

The positive electrode GN4 is an electrode formed by subjecting the graphene oxide to heat reduction treatment. The heat reduction treatment was performed at 170° C. for 10 hours in a reduced-pressure atmosphere. After that, the electrode was washed after being immersed in an electrolyte solution, like the above positive electrodes.

(XPS Analysis Results)

Table 4 and Table 5 show XPS analysis results of the positive electrode active material layers of the positive electrodes GN1 to GN4.

TABLE 4

| Positive electrode | C=C | C—C, C—H | C—O | C=O | O=C—O, CF | CF2, metal-CO3 |
|---|---|---|---|---|---|---|
| Positive electrode GN1 | 0.0 | 22.8 | 17.1 | 3.2 | 0.6 | 4.6 |
| Positive electrode GN2 | 24.1 | 18.8 | 8.4 | 1.7 | 1.9 | 4.5 |
| Positive electrode GN3 | 27.5 | 15.2 | 8.8 | 3.0 | 2.2 | 3.0 |
| Positive electrode GN4 | 24.6 | 19.5 | 7.7 | 1.9 | 1.8 | 3.9 | unit: atomic %

TABLE 5

| Positive electrode | C=C | C—C, C—H | C—O | C=O | O=C—O, CF | CF2, metal-CO3 |
|---|---|---|---|---|---|---|
| Positive electrode GN1 | 0.0 | 47.1 | 35.5 | 6.6 | 1.2 | 9.5 |
| Positive electrode GN2 | 40.5 | 31.7 | 14.2 | 2.8 | 3.2 | 7.6 |
| Positive electrode GN3 | 46.0 | 25.5 | 14.8 | 5.1 | 3.7 | 5.0 |
| Positive electrode GN4 | 41.4 | 32.9 | 12.9 | 3.3 | 3.0 | 6.6 | unit: atomic %

Bonding states of carbon included in the positive electrode active material layers of the positive electrodes GN1 to GN4 were analyzed by waveform separation of a C1$_S$ spectrum and listed by state in Table 4 and Table 5. Table 4 shows the proportions of the bonding states of carbon measured by XPS analysis. Table 5 shows the proportions of the bonding states in all the bonding states.

As shown in Table 4 and Table 5, while the C=C bond was not measured in the positive electrode GN1 which was not subjected to reduction treatment, the positive electrodes GN2 to GN4 which were subjected to reduction treatment include the C=C bond at 24.1 atomic % (40.5% of all the states), 27.5 atomic % (46.0%), and 24.6 atomic % (41.4%), respectively. Further, while the positive electrode GN1 which was not subjected to reduction treatment includes many C—O bonds (17.1 atomic %), the positive electrodes GN2 to GN4 which were subjected to reduction treatment include fewer C—O bonds (8.4 atomic %, 8.8 atomic %, and 7.7 atomic %, respectively). Although the positive electrode active material layers of the analyzed electrodes also include a binder, such reduction treatment does not change the composition of the binder. Thus, reduction treatment reduces the number of functional groups bonded to the graphene oxide and accordingly the number of C—O bonds decreases while the number of C=C bonds increases.

As described above, reduction treatment after application of a positive electrode paste enabled the graphene oxide included in the positive electrode paste to be reduced.

The bonding states of carbon included in a positive electrode active material layer in a positive electrode formed by such reduction treatment are as follows: the proportion of the C=C bond is greater than or equal to 35% and the proportion of the C—O bond is greater than or equal to 5% and less than or equal to 20%; preferably, the proportion of the C=C bond is greater than or equal to 40% and the proportion of the C—O bond is greater than or equal to 10% and less than or equal to 15%.

By using such a positive electrode active material layer, a positive electrode for a nonaqueous secondary battery which can achieve high electron conductivity can be provided with a small amount of a conductive additive. A high-density positive electrode for a nonaqueous secondary battery which is highly filled can be provided with a small amount of a conductive additive.

Note that the above XPS analysis was performed with the positive electrode active material layers including a binder. For comparison, results of XPS analysis performed before and after heat reduction of a simple substance of graphene oxide in the form of powder are shown in Table 6 and Table 7. Table 6 shows the weight proportions of the bonding states of carbon included the graphene oxide in the form of powder and Table 7 shows proportions of the bonding states in all the bonding states.

TABLE 6

| Positive electrode | C=C | C—C, C—H | C—O | C=O | O=C—O, CF | CF2 |
|---|---|---|---|---|---|---|
| Graphene oxide | 0.0 | 26.6 | 25.8 | 10.0 | 3.7 | 0.0 |
| After heat reduction | 40.5 | 20.5 | 7.1 | 2.9 | 1.7 | 0.0 | unit: atomic %

TABLE 7

| Positive electrode | C=C | C—C, C—H | C—O | C=O | O=C—O, CF | CF2 |
|---|---|---|---|---|---|---|
| Graphene oxide | 0.0 | 40.3 | 39.0 | 15.2 | 5.6 | 0.0 |
| After heat reduction | 55.7 | 28.1 | 9.8 | 4.0 | 2.3 | 0.0 | unit: atomic %

It can be found that the heat reduction increases the number of the C=C bonds while reducing the number of the C—O bonds.

REFERENCE NUMERALS

100: NMP, 101: graphene or RGO, 102: graphene oxide, 200: positive electrode, 201: positive electrode current collector, 202: positive electrode active material layer, 203: positive electrode active material particle, 204: graphene, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 401: container, 402: graphene oxide dispersion liquid, 403: formation subject, 404: conductor, 405: container, 406: electrolyte solution, 407: conductor, 408: counter electrode, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket (insulating packing), 611: PTC element, 612: safety valve mechanism, 700: display device, 701: housing, 702: display portion, 703: speaker portion, 704: nonaqueous secondary battery, 710: lighting device, 711: housing, 712: light source, 713: nonaqueous secondary battery, 714: ceiling, 715: wall, 716: floor, 717: window, 720: indoor unit, 721: housing, 722: air outlet, 723: nonaqueous secondary battery, 724: outdoor unit, 730: electric refrigerator-freezer, 731: housing, 732: door for refrigerator, 733: door for freezer, 734: nonaqueous secondary battery, 800: tablet terminal, 801: housing, 802: display portion, 802a: display portion, 802b: display portion, 803: switch for switching display modes, 804: power switch, 805: switch for switching to power-saving mode, 807: operation switch, 808a: region, 808b: region, 809: operation key, 810: switching button for showing/hiding keyboard, 811: solar cell, 850: charge-discharge control circuit, 851: battery, 852: DCDC converter, 853: converter, 860: electric vehicle, 861: battery, 862: control circuit, 863: driving device, 864: processing unit, 901a: discharge curve of cell D, 901b: charge curve of cell D, 902a: discharge curve of cell G, 902b: charge curve of cell G, 903a: discharge curve of cell H, 903b: charge curve of cell H, 1001: positive electrode active material, 1002: graphene, 1003: positive electrode active material, 1004: RGO, 1005: positive electrode active material, and 1006: graphene.

This application is based on Japanese Patent Application serial no. 2012-089346 filed with the Japan Patent Office on Apr. 10, 2012 and Japanese Patent Application serial no. 2012-125138 filed with the Japan Patent Office on May 31, 2012, the entire contents of which are hereby incorporated by reference.

The invention claimed is:

1. A method of manufacturing a positive electrode for a nonaqueous secondary battery, comprising:
    forming a paste including a dispersion medium, a plurality of active materials, a plurality of graphene oxides and a binding agent, wherein an atomic ratio of oxygen to carbon in the plurality of graphene oxides is 0.405 or more;
    applying the paste on a current collector; and
    reducing the plurality of graphene oxides after or at the same time when the dispersion medium included in the applied paste is volatilized, whereby an active material layer comprising a plurality of graphenes is formed over the current collector.

2. The method of manufacturing a positive electrode for a nonaqueous secondary battery according to claim 1,
wherein the paste is manufactured by the following steps:
dispersing the plurality of graphene oxides into the dispersion medium,
adding the plurality of active materials to the dispersion medium into which the plurality of graphene oxides are dispersed and performing mixing to form a mixture; and
adding the binding agent to the mixture and performing mixing.

3. The method of manufacturing a positive electrode for a nonaqueous secondary battery according to claim 1,
wherein the plurality of graphene oxides comprise one or more groups selected from an epoxy group, a carbonyl group, a carboxyl group, and a hydroxyl group.

4. The method of manufacturing a positive electrode for a nonaqueous secondary battery according to claim 1,
wherein the plurality of active materials are lithium iron phosphate.

5. The method of manufacturing a positive electrode for a nonaqueous secondary battery according to claim 1,
wherein a compounding ratio of A:B:C=X:Y:Z is satisfied in the paste, where A is the plurality of graphene oxides, B is the plurality of active materials, C is the binding agent, X is 2 to 10, Y is 85 to 93, and Z is 1 to 5.

6. The method of manufacturing a positive electrode for a nonaqueous secondary battery according to claim 1,
wherein a compounding ratio of A:B:C=P:Q:R is satisfied in the active material layer, where A is the plurality of graphenes, B is the plurality of active materials, C is the binding agent, P is 1 to 5, Q is 90 to 94, and R is 1 to 5.

7. The method of manufacturing a positive electrode for a nonaqueous secondary battery according to claim 1,
wherein, in the active material layer:
at least one of the plurality of graphenes is larger than an average particle diameter of the plurality of active materials,
the plurality of graphenes are dispersed in the active material layer such that at least one of the plurality of graphenes makes surface contact with one or more adjacent graphenes, and
at least one of the plurality of graphenes makes surface contact with at least one of the plurality of active materials in such a way as to wrap part of a surface thereof.

8. A method of manufacturing a positive electrode for a nonaqueous secondary battery, comprising:
forming a paste including a dispersion medium, a plurality of active materials, a plurality of graphene oxides and a binding agent, wherein an atomic ratio of oxygen to carbon in the plurality of graphene oxides is 0.405 or more;
applying the paste on a current collector; and
electrochemically reducing the plurality of graphene oxides after the dispersion medium included in the applied paste is volatilized, whereby an active material layer comprising a plurality of graphenes is formed over the current collector,
wherein, as bonding states of carbon included in the active material layer, a proportion of a C=C bond is 35% or more and a proportion of a C—O bond is 5% or more and 20% or less.

9. The method of manufacturing a positive electrode for a nonaqueous secondary battery according to claim 8,
wherein the paste is manufactured by the following steps:
dispersing the plurality of graphene oxides into the dispersion medium,
adding the plurality of active materials to the dispersion medium into which the plurality of graphene oxides are dispersed and performing mixing to form a mixture; and
adding the binding agent to the mixture and performing mixing.

10. The method of manufacturing a positive electrode for a nonaqueous secondary battery according to claim 8,
wherein, in the active material layer:
at least one of the plurality of graphenes is larger than an average particle diameter of the plurality of active materials,
the plurality of graphenes are dispersed in the active material layer such that at least one of the plurality of graphenes makes surface contact with one or more adjacent graphenes, and
at least one of the plurality of graphenes makes surface contact with at least one of the plurality of active materials in such a way as to wrap part of a surface thereof.

11. The method of manufacturing a positive electrode for a nonaqueous secondary battery according to claim 8,
wherein the plurality of graphene oxides comprise one or more groups selected from an epoxy group, a carbonyl group, a carboxyl group, and a hydroxyl group.

12. The method of manufacturing a positive electrode for a nonaqueous secondary battery according to claim 8,
wherein the plurality of active materials are lithium iron phosphate.

13. The method of manufacturing a positive electrode for a nonaqueous secondary battery according to claim 8,
wherein a compounding ratio of A:B:C=X:Y:Z is satisfied in the paste, where A is the plurality of graphene oxides, B is the plurality of active materials, C is the binding agent, X is 2 to 10, Y is 85 to 93, and Z is 1 to 5.

14. The method of manufacturing a positive electrode for a nonaqueous secondary battery according to claim 8,
wherein a compounding ratio of A:B:C=P:Q:R is satisfied in the active material layer, where A is the plurality of graphenes, B is the plurality of active materials, C is the binding agent, P is 1 to 5, Q is 90 to 94, and R is 1 to 5.

* * * * *